(12) United States Patent
Bai

(10) Patent No.: US 10,560,130 B2
(45) Date of Patent: *Feb. 11, 2020

(54) MULTIWAY SWITCH, RADIO FREQUENCY SYSTEM, AND WIRELESS COMMUNICATION DEVICE

(71) Applicant: Guangdong Oppo Mobile Telecommunications Corp., Ltd., Dongguan, Guangdong (CN)

(72) Inventor: Jian Bai, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/180,465

(22) Filed: Nov. 5, 2018

(65) Prior Publication Data

US 2019/0288715 A1    Sep. 19, 2019

(30) Foreign Application Priority Data

Mar. 16, 2018   (CN) .......................... 2018 1 0220932

(51) Int. Cl.
*H04B 1/00* (2006.01)
*H04B 1/401* (2015.01)
(Continued)

(52) U.S. Cl.
CPC ........... *H04B 1/006* (2013.01); *H04B 1/0064* (2013.01); *H04B 1/401* (2013.01); *H04B 1/44* (2013.01);
(Continued)

(58) Field of Classification Search
CPC .... H04B 7/0404; H04B 7/0686; H04B 1/006; H04B 7/0413; H04B 1/401; H04B 1/0064;
(Continued)

(56) References Cited

U.S. PATENT DOCUMENTS 6,397,082 B1    5/2002   Searle
8,159,394 B2    4/2012   Hayes et al.
(Continued)

FOREIGN PATENT DOCUMENTS

CN    101867402 A    10/2010
CN    202103661 A    1/2012
(Continued)

OTHER PUBLICATIONS

Extended European search report issued in corresponding European application No. 18204533.6 dated May 29, 2019.
(Continued)

*Primary Examiner* — Leila Malek

(74) *Attorney, Agent, or Firm* — Young Basile Hanlon & MacFarlane, P.C.

(57) ABSTRACT

A multiway switch, a radio frequency system, and a wireless communication device are provided. The multiway switch includes six T ports and $2^n$ P ports. The six T ports include two first T ports and each of the two first T ports is coupled with all of the $2^n$ P ports. n is an integer and n≥2. The multiway switch is configured to be coupled with a radio frequency circuit and an antenna system of a wireless communication device operable in a dual-frequency single-transmit mode, to implement a preset function of the wireless communication device. The antenna system includes $2^n$ antennas corresponding to the $2^n$ P ports. The preset function is a function of transmitting a sounding reference signal (SRS) through the $2^n$ antennas in turn.

18 Claims, 17 Drawing Sheets

(51) Int. Cl.
*H04B 7/0404* (2017.01)
*H04B 7/06* (2006.01)
*H04B 7/08* (2006.01)
*H04B 1/44* (2006.01)

(52) U.S. Cl.
CPC ......... *H04B 7/0404* (2013.01); *H04B 7/0604* (2013.01); *H04B 7/0802* (2013.01)

(58) Field of Classification Search
CPC ...... H04B 1/44; H04B 7/0602; H04B 7/0604; H04B 7/0802; H01Q 3/247; H01Q 5/392
USPC .......................................................... 375/267
See application file for complete search history.

(56) References Cited

U.S. PATENT DOCUMENTS

| | | | |
|---|---|---|---|
| 8,445,770 B2 | 5/2013 | Jacob | |
| 8,629,813 B2 | 1/2014 | Milosavljevic | |
| 8,644,271 B2 | 2/2014 | Rich et al. | |
| 9,484,619 B2 | 11/2016 | Korva et al. | |
| 9,490,863 B2 | 11/2016 | Dupuy et al. | |
| 9,577,691 B2 | 2/2017 | Hanaoka | |
| 9,578,684 B2 | 2/2017 | Porter et al. | |
| 9,602,155 B2 | 3/2017 | Chartier | |
| 9,717,008 B1 | 7/2017 | Sharma | |
| 9,854,454 B2 | 12/2017 | Shen et al. | |
| 9,906,260 B2 | 2/2018 | Ramachandran et al. | |
| 9,960,791 B2 | 5/2018 | Desclos et al. | |
| 9,960,802 B2 | 5/2018 | Ku | |
| 10,075,199 B2 | 9/2018 | King et al. | |
| 10,128,963 B2 | 11/2018 | Sharma | |
| 2005/0036505 A1 | 2/2005 | Frei et al. | |
| 2009/0054093 A1* | 2/2009 | Kim | H04B 7/061 455/500 |
| 2013/0308554 A1 | 11/2013 | Ngai et al. | |
| 2014/0211873 A1 | 7/2014 | Park et al. | |
| 2014/0227982 A1 | 8/2014 | Granger-Jones et al. | |
| 2014/0293841 A1 | 10/2014 | Rousu | |
| 2015/0171914 A1 | 6/2015 | Desclos et al. | |
| 2015/0340769 A1 | 11/2015 | Desclos et al. | |
| 2017/0155444 A1 | 6/2017 | Patel et al. | |
| 2017/0164226 A1 | 6/2017 | Wei et al. | |
| 2017/0195004 A1* | 7/2017 | Cheng | H04B 7/0602 |
| 2018/0026379 A1 | 1/2018 | Barker et al. | |

FOREIGN PATENT DOCUMENTS

| | | |
|---|---|---|
| CN | 103905104 A | 7/2014 |
| CN | 105245295 A | 1/2016 |
| CN | 105703053 A | 6/2016 |
| CN | 106533526 A | 3/2017 |
| CN | 106559277 A | 4/2017 |
| CN | 106685621 A | 5/2017 |
| CN | 106712795 A | 5/2017 |
| CN | 107070485 A | 8/2017 |
| CN | 107171672 A | 9/2017 |
| CN | 108462499 A | 8/2018 |
| CN | 108462506 A | 8/2018 |
| CN | 108462507 A | 8/2018 |
| CN | 108512556 A | 9/2018 |
| CN | 108512567 A | 9/2018 |
| CN | 108512568 A | 9/2018 |
| CN | 108599779 A | 9/2018 |
| EP | 2485555 A1 | 8/2012 |
| WO | 2012026601 A1 | 3/2012 |
| WO | 2012109988 A1 | 8/2012 |
| WO | 2015131020 A1 | 9/2015 |

OTHER PUBLICATIONS

Gao Xiang et al: "Multi-Switch for Antenna Selection in Massive MIMO", 2015 IEEE Global Communications Conference (GLOBECOM), IEEE, Dec. 6, 2015 (Dec. 6, 2015), pp. 1-6, XP032872922, DOI: 10.1109/GLOCOM.2014.7417765; abstract; figures 1, 2, 5, 6; Sections I, III.B, III.C.
Guy Lemieux et al: "Generating highly-routable sparse crossbars for PLDs", FPGA'00. ACM/SIGDA International Symposium on Field Programmable Gate Arrays. Monterey, CA, Feb. 9-11, 2000; [ACM/SIGDA International Symposium on Field Programmable Gate Arrays], New York, NY: ACM, US, Feb. 1, 2000 (Feb. 1, 2000), pp. 155-164, XP058160667, DOI: 10.1145/329166.329199; ISBN: 978-1-58113-193-2; abstract; figure 1; Section 2.
International search report issued in corresponding international application No. PCT/CN2018/112708 dated Jan. 30, 2019.
International search report issued in corresponding international application No. PCT/CN2018/111027 dated Jan. 17, 2019.
Extended European search report issued in corresponding European application No. 18210041.2 dated May 28, 2019.
International search report issued in corresponding international application No. PCT/CN2018/117708 dated Jan. 30, 2019.
International search report issued in corresponding international application No. PCT/CN2018/114406 dated Jan. 30, 2019.

* cited by examiner

MULTIWAY SWITCH, RADIO FREQUENCY SYSTEM, AND WIRELESS COMMUNICATION DEVICE

CROSS-REFERENCE TO RELATED APPLICATION(S)

This application claims priority to Chinese Patent Application No. 201810220932.5, filed on Mar. 16, 2018, the disclosure of which is hereby incorporated by reference in its entirety.

TECHNICAL FIELD

This disclosure relates to the technical field of mobile terminals, and more particularly to a multiway switch, a radio frequency system, and a wireless communication device.

BACKGROUND

With the widespread use of electronic devices such as smart phones, the smart phone can support an increasing number of applications and is becoming more and more powerful. The smart phone is developing in a diversified and personalized way, becoming indispensable electronic products in users' life. In the fourth generation (4G) mobile communication system, the electronic device generally adopts a single-antenna or dual-antenna radio frequency system architecture. Currently, in a new radio (NR) system of the fifth generation (5G) mobile communication system, an electronic device supporting a four-antenna radio frequency system architecture is proposed.

SUMMARY

Implementations of the disclosure provide a multiway switch, a radio frequency system, and a wireless communication device, to implement a function of transmitting a sounding reference signal (SRS) through $2^n$ antennas corresponding to $2^n$ ports in turn (that is, $2^n$-port SRS) of a wireless communication device in a fifth generation new radio (5G NR).

According to a first aspect of implementations of the disclosure, a multiway switch is provided. The multiway switch includes six T ports and $2^n$ P ports. The six T ports include two first T ports and each of the two first T ports is fully coupled with the $2^n$ P ports. n is an integer and n≥2.

The multiway switch is configured to be coupled with a radio frequency circuit and an antenna system of a wireless communication device operable in a dual-frequency single-transmit mode, to implement a preset function of the wireless communication device. The antenna system includes $2^n$ antennas corresponding to the $2^n$ P ports. The preset function is a function of transmitting a sounding reference signal (SRS) through the $2^n$ antennas in turn.

According to a second aspect of implementations of the disclosure, a radio frequency system is provided. The radio frequency system includes an antenna system, a radio frequency circuit, and a multiway switch coupled with the radio frequency circuit and the antenna system.

The multiway switch includes six T ports and $2^n$ P ports, the six T ports include two first T ports at least supporting a transmission function and four second T ports supporting only a reception function, and each of the two first T ports is coupled with all of the $2^n$ P ports. The antenna system includes $2^n$ antennas corresponding to the $2^n$ P ports. n is an integer and n≥2. The multiway switch is configured to implement a preset function of transmitting an SRS through the $2^n$ antennas in turn.

According to a third aspect of implementations of the disclosure, a wireless communication device is provided. The wireless communication device includes an antenna system, a radio frequency transceiver, a radio frequency circuit coupled with the radio frequency transceiver, and a multiway switch coupled with the radio frequency circuit and the antenna system.

The multiway switch includes six T ports and $2^n$ P ports, the six T ports include two first T ports, and each of the two first T ports is coupled with all of the $2^n$ P ports. The antenna system includes $2^n$ antennas corresponding to the $2^n$ P ports. n is an integer and n≥2.

The multiway switch is configured to implement a preset function of transmitting an SRS through the $2^n$ antennas in turn.

BRIEF DESCRIPTION OF THE DRAWINGS

To describe technical solutions in implementations of the present disclosure or in the related art more clearly, the following briefly introduces the accompanying drawings required for describing the implementations or the related art.

DETAILED DESCRIPTION

Technical solutions in implementations of the present disclosure will be described clearly and completely hereinafter with reference to the accompanying drawings described in the previous chapter. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", and the like used in the specification, the claims, and the accompany drawings of the present disclosure are to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units. Instead, it can optionally include other steps or units that are not listed; alternatively, other steps or units inherent to the process, method, product, or device can also be included.

The term "embodiment" or "implementation" referred to herein means that a particular feature, structure, or characteristic described in conjunction with the implementation may be contained in at least one implementation of the present disclosure. The phrase appearing in various places in the specification does not necessarily refer to the same implementation, nor does it refer to an independent or alternative implementation, that is, mutually exclusive with other implementations. It is explicitly and implicitly understood by those skilled in the art that an implementation described herein may be combined with other implementations.

Figure 1A:
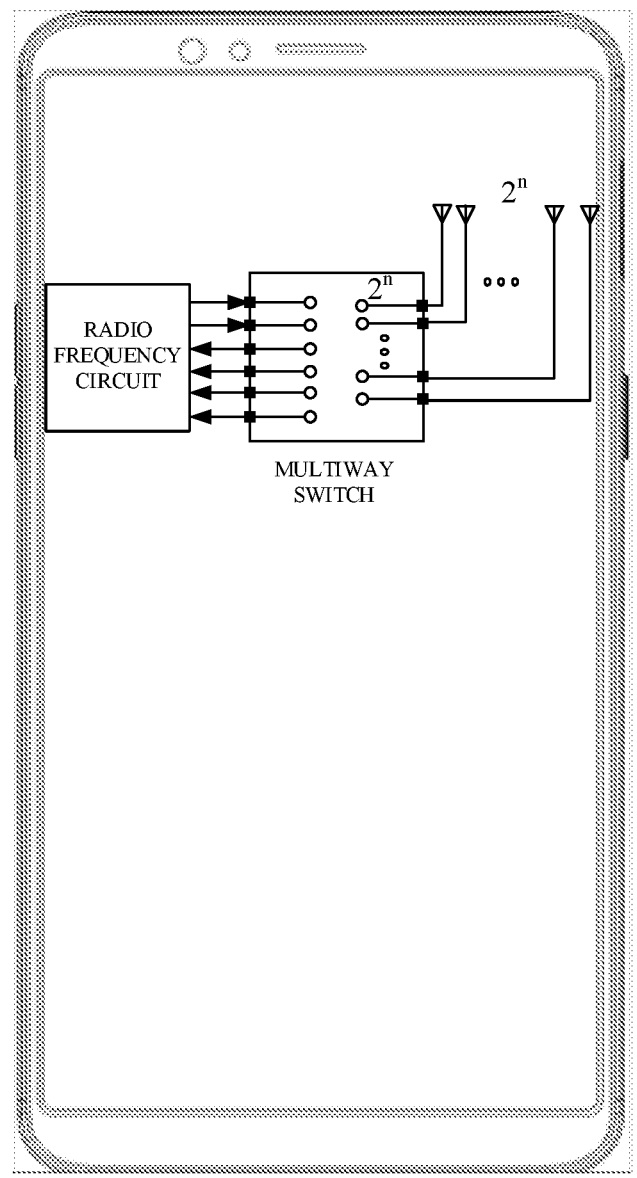
FIG. 1A is a schematic structural diagram illustrating a multiway switch according to an implementation of the disclosure.

According to the implementations of the disclosure, a multiway switch is provided. As illustrated in FIG. 1A, the multiway switch includes six T ports and $2^n$ P ports, the six T ports includes two first T ports, and each of the two first T ports is coupled with all of the $2^n$ P ports. n is an integer and n≥2. The multiway switch is configured to be coupled with a radio frequency circuit and an antenna system of a wireless communication device operable in a dual-frequency single-transmit mode, to implement a preset function of the wireless communication device, the antenna system includes $2^n$ antennas corresponding to the $2^n$ P ports, and the preset function is a function of transmitting a sounding reference signal (SRS) through the $2^n$ antennas in turn.

In one implementation, the six T ports further include four second T ports, each of the four second T ports is coupled with one of the $2^n$ P ports and T ports at the same frequency band in the four second T ports are coupled with different P ports. Each of the $2^n$ P ports is configured to be coupled with a corresponding antenna of the $2^n$ antennas. The two first T ports at least support a transmission function and the four second T ports support only a reception function.

In one implementation, the radio frequency circuit logically includes two transceiver circuits and $2^{n+1}$ receiver circuits and the radio frequency circuit physically includes at least one independent circuit module. The at least one independent circuit module includes first ports and second ports. The first ports are configured to be coupled with the two first T ports in one-to-one correspondence and the second ports are configured to be coupled with four second T ports in one-to-one correspondence.

According to the implementations of the disclosure, a radio frequency system is provided. The radio frequency system includes an antenna system, a radio frequency circuit, and a multiway switch coupled with the radio frequency circuit and the antenna system.

The multiway switch includes six T ports and $2^n$ P ports, the six T ports include two first T ports at least supporting a transmission function and four second T ports supporting only a reception function, and each of the two first T ports is coupled with all of the $2^n$ P ports. n is an integer and n≥2. The antenna system includes $2^n$ antennas corresponding to the $2^n$ P ports. The multiway switch is configured to implement a preset function of transmitting an SRS through the $2^n$ antennas in turn.

In one implementation, each of the four second T ports is coupled with one of the $2^n$ P ports, and T ports at the same frequency band in the four second T ports are coupled with different P ports. Each of the $2^n$ P ports is coupled with a corresponding antenna of the $2^n$ antennas.

According to the implementations of the disclosure, a wireless communication device is provided. The wireless communication device includes an antenna system, a radio frequency transceiver, a radio frequency circuit coupled with the radio frequency transceiver, and a multiway switch coupled with the radio frequency circuit and the antenna system.

The multiway switch includes six T ports and $2^n$ P ports, the six T ports include two first T ports, and each of the two first T ports is coupled with all of the $2^n$ P ports. n is an integer and n≥2. The antenna system includes $2^n$ antennas corresponding to the $2^n$ P ports. The multiway switch is configured to implement a preset function of transmitting an SRS through the $2^n$ antennas in turn.

In one implementation, the six T ports further include four second T ports, each of the four second T ports is coupled with one of the $2^n$ P ports, and T ports at the same frequency band in the four second T ports are coupled with different P ports. Each of the $2^n$ P ports is coupled with a corresponding antenna of the $2^n$ antennas. The two first T ports at least support a transmission function and the four second T ports support only a reception function.

The wireless communication device involved in the implementations of the present disclosure may include an electronic device or a network device. The electronic device may include various handheld devices, in-vehicle devices, wearable devices, computing devices that have wireless communication functions or other processing devices connected to the wireless modem, as well as various forms of user equipment (UE), mobile stations (MS), terminal devices, and the like. For the convenience of description, the above-mentioned devices are collectively referred to as an electronic device.

The network device may be a base station, and the base station may be configured to communicate with one or more electronic devices, or may be configured to communicate with one or more base stations with partial electronic device functions (such as communication among a macro base station, a micro base station, and an access point). The base station may be a base transceiver station (BTS) in a time division synchronous code division multiple access (TD-SCDMA) system, an evolutional node B (eNB) in a long term evolution (LTE) system, or a base station in a fifth generation new radio (5G NR) system. In addition, the base station may also be an access point (AP), a transmission node (Trans TRP), a central unit (CU), or other network entities, and can also include some or all of the functions of the above network entities.

The following describes an electronic device as an example of the wireless communication device and describes the case where n=2, that is, four antennas and four P ports are configured, as an example. It is to be noted that, the number of the antennas and the P ports are not limited to four, and the number thereof can be extended to $2^n$ (n being an integer and n≥2) in the implementations of the disclosure. In the case where $2^n$ antennas and $2^n$ P ports are configured, with regard to logical composition of the radio frequency circuit, physical composition of the radio frequency circuit, coupling between the independent circuit modules and the T ports, coupling between the T ports and the P ports, coupling between the P ports and the antennas, and the like, reference may be made in the following implementations. As for the principle of achieving the transmitting an SRS through the $2^n$ antennas in turn and the structure of simplified switch, reference may further be made to related descriptions in the following implementations.

At present, sounding reference signal (SRS) switching in four antennas of a mobile phone is a mandatory option for China mobile communications corporation (CMCC) in the China mobile fifth generation (5G) Scale Test Technical White Paper_Terminal, which is optional in the 3rd generation partnership project (3GPP). A main purpose of the SRS transmission is for a base station to determine quality and parameters of four channels via measuring uplink signals transmitted by the four antennas of the mobile phone in turn, to perform a beamforming of a downlink massive multi-input multi-output (MIMO) antenna array on the four channels according to a channel reciprocity, and finally to obtain the best data transmission performance for a downlink 4×4 MIMO, where 4×4 MIMO refers to that the base station has four antennas transmitting data and the terminal device has four antennas receiving data.

In order to satisfy requirements of SRS switching in four antennas, implementations of the present disclosure provide a radio frequency architecture based on a simplified 4P6T antenna switch. Compared with a 3P3T/DPDT/multiway small switch switching scheme, the present switching scheme can reduce the number of series switches in each path (all or part of switches are integrated into the 4P6T main switch), thereby reducing link loss and optimizing the overall transmission and reception performance of the terminal. The implementations of the present disclosure are described in detail below.

Figure 1B:
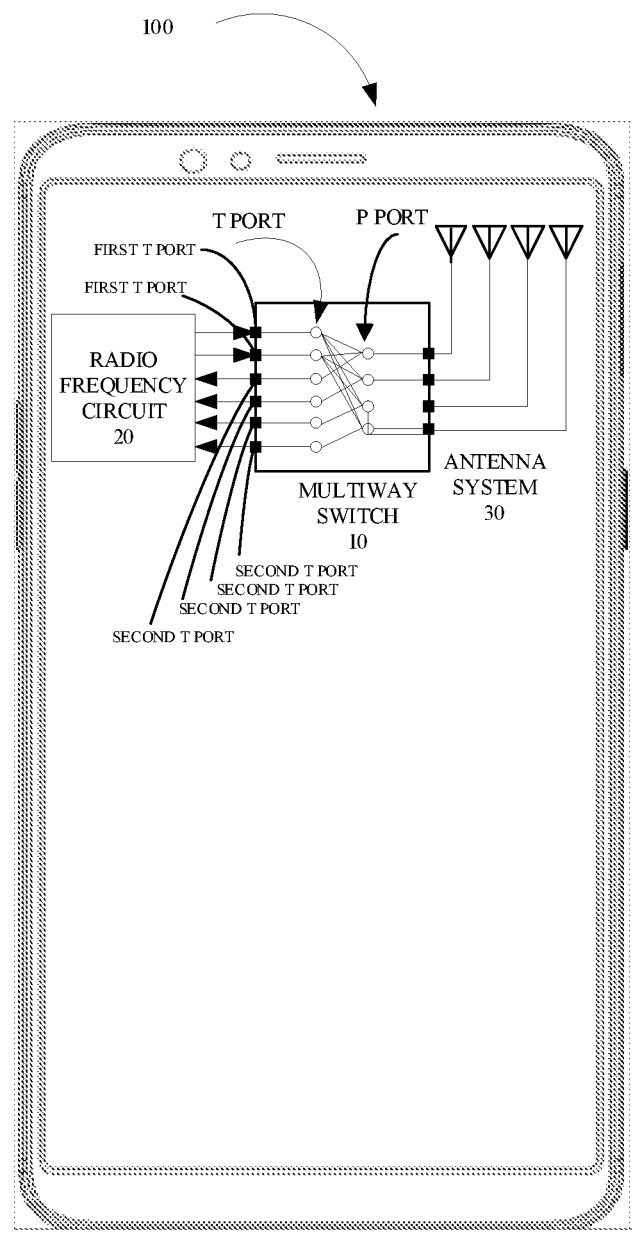
FIG. 1B is a schematic structural diagram illustrating a multiway switch according to an implementation of the disclosure.

FIG. 1B is a schematic structural diagram illustrating a multiway switch 10 according to an implementation of the disclosure. The multiway switch 10 includes six T ports and four P ports. The six T ports include two first T ports and each of the two first T ports is coupled with all of the four P ports (that is, fully-coupled). The remaining four T ports are coupled with the four P ports in one-to-one correspondence, such that any two T ports of the remaining four T ports are coupled with different P ports. The multiway switch 10 is applicable to an electronic device 100 operable in a dual-frequency single-transmit mode. The electronic device 100 includes a radio frequency circuit 20 and an antenna system 30. The antenna system 30 includes four antennas. The four antennas correspond to the four P ports; specifically, the four antennas and the four P ports are in one-to-one correspondence.

The multiway switch 10 is configured to be coupled with the radio frequency circuit 20 and the antenna system 30 to implement a preset function of the electronic device 100. The preset function is a function of transmitting an SRS through the four antennas in turn, which can be understood as a four-port SRS function.

Figure 2:
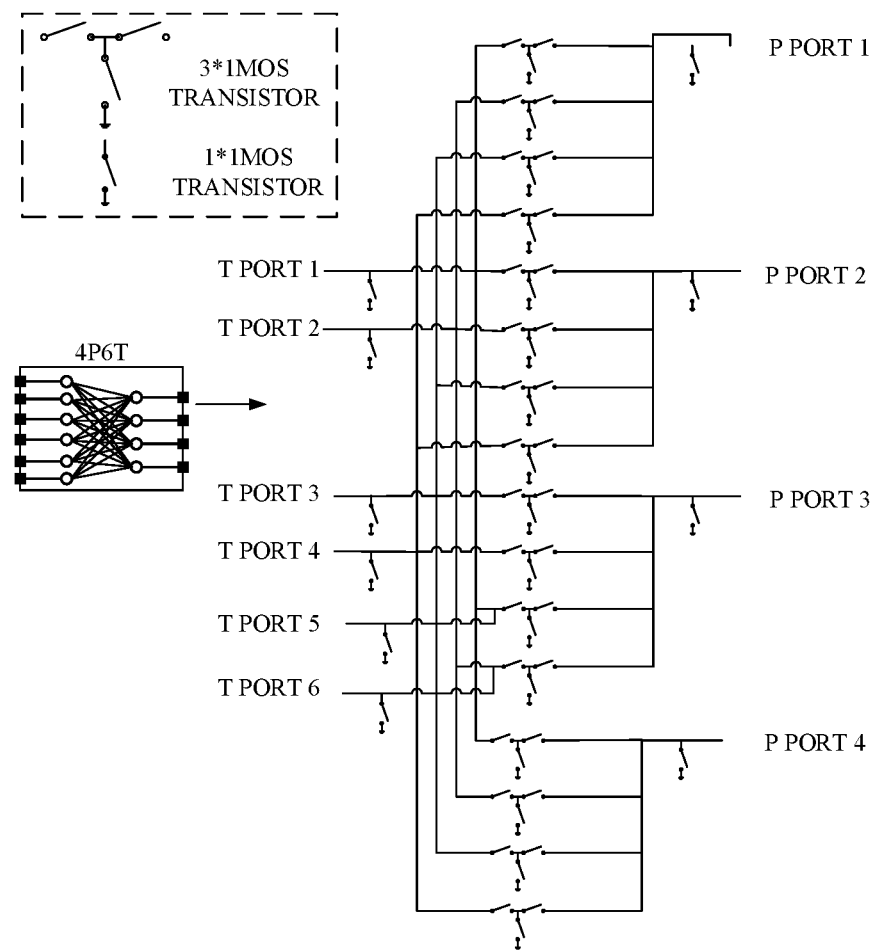
FIG. 2 is a schematic structural diagram illustrating a fully coupled 4P6T switch according to an implementation of the disclosure.

"P port" in implementations of the disclosure is the abbreviation of "pole port", which refers to ports coupled with antennas. "T port" in implementations of the disclosure is the abbreviation of "throw port", which refers to ports coupled with radio frequency circuits. According to the implementations of the disclosure, the four P ports and the six T ports are provided, and to facilitate an intuitive understanding of the structure of the multiway switch 10, the multiway switch 10 may also be referred to as a "4P6T switch". As illustrated in FIG. 2 for example, the four P ports are embodied as P port 1, P port 2, P port 3, and P port 4.

The concept of "coupling", "separate-coupling", "full-coupling", or other kinds of coupling between the T ports and the P ports of the multiway switch 10 described in the implementations of the disclosure refers to a state in which the T ports are coupled with the P ports through first switch transistors. The first switch transistors are configured to control a unidirectional conduction state between the T ports and the P ports (including a unidirectional conduction state from the T ports to the P ports and a unidirectional conduction state from the P ports to the T ports). The first switch transistor can be, for example, a switch array including three field-effect transistors (such as metal-oxide-semiconductor (MOS) transistors). When the first switch transistor is disconnected and not grounded, parasitic parameters (such as parasitic capacitances and parasitic inductances) will greatly affect performance of other connected ports. Therefore, the first switch transistor is implemented with three MOS transistors, where the three MOS transistors can be in a common source connection, that is, coupled at a common source. When the first switch transistor is disconnected, two MOS transistors at two ends are disconnected and one MOS transistor in the middle is grounded. In addition to the first switch transistors between the T ports and the P ports, the multiway switch 10 further includes second switch transistors arranged around both T ports and P ports. The second switch transistor may also be referred to as a grounding switch transistor. Each T port may be provided with a grounding switch transistor and each P port may also be provided with a grounding switch transistor. When a T port or a P port does not carry out signal transmission or reception, a grounding switch transistor around the T port or the P port is switched on. When a T port or a P port receives or transmits signals, a grounding switch transistor around the T port or the P port is disconnected. The second switch transistor is configured to enable a corresponding port (T port or P port) and can be, for example, a MOS transistor. The specific configurations of the first switch transistor and the second switch transistor are not limited herein. In one implementation, the electronic device 100 can control paths between the T ports and the P ports to switch on through the first switch transistors. As one implementation, the electronic device 100 can be provided with a dedicated controller to be coupled with switch transistors of the multiway switch 10.

The concept of "fully coupled" is defined for the T ports and means that one T port is respectively coupled with all P ports. The expression of "the first T ports are fully coupled ports" means that each of the two first T ports is fully coupled with the four P ports.

The function of transmitting an SRS through the four antennas corresponding to the four P ports in turn refers to a process in which the electronic device interacts with a base station based on polling mechanism to determine quality of an uplink channel corresponding to each antenna.

The electronic device may be a mobile phone or other terminal devices supporting the 5G NR, such as customer premise equipment (CPE) or a mobile wireless-fidelity (MIFI).

The dual-frequency single-transmit mode refers to an operating mode in which the electronic device can support dual frequency band-one uplink (UL) transmit path or dual frequency band-four downlink (DL) receive paths.

The multiway switch 10 includes field-effect transistors. Since two of the six T ports are coupled with all of the four P ports and each of other T ports is configured to be coupled with one fixed antenna for receiving, the number of built-in field-effect transistors, volume, and cost of the 4P6T switch can be reduced, and performance of the 4P6T switch can be improved as well. Details will be described hereinafter.

Figure 3:
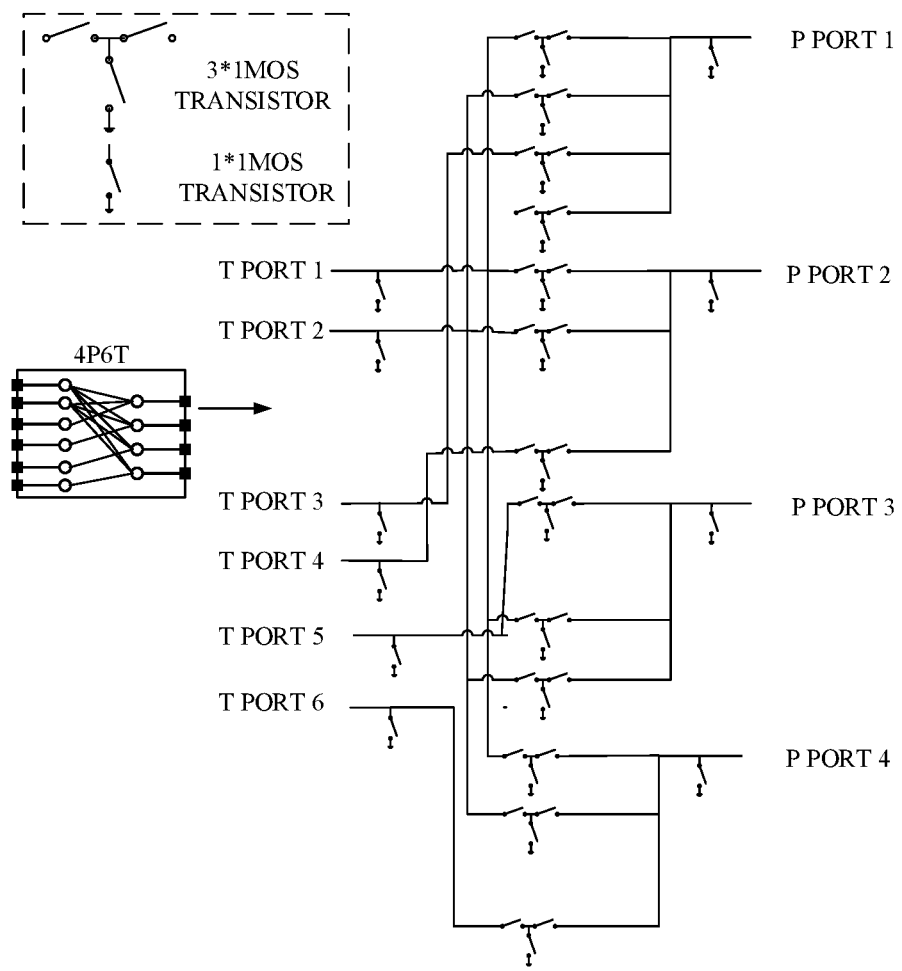
FIG. 3 is a schematic structural diagram illustrating a simplified 4P6T switch according to an implementation of the disclosure.

For example, assume that the multiway switch includes six T ports, i.e., T port 1, T port 2, T port 3, T port 4, T port 5, and T port 6 illustrated in FIG. 2, and further includes field-effect transistors; among the six T ports, if each T port is fully coupled with the four P ports, as illustrated in FIG. 2 of a schematic structural diagram of the multiway switch, the number of the field-effect transistors of the multiway switch is 6+6*4*3+4=82; if only two T ports are fully coupled with the four P ports, as illustrated in FIG. 3 of a schematic structural diagram of the multiway switch, the number of the field-effect transistors of the multiway switch is 6+(2*4+(6−2)*1)*3+4=46.

In one implementation, the electronic device 100 may further include a radio frequency transceiver. The radio frequency transceiver is coupled with the radio frequency circuit 20.

By limiting the number of T ports that are fully coupled with the four P ports (in other words, fully coupled T ports), the number of switches of the radio frequency system of the electronic device 100 can be effectively reduced. The number of fully coupled T ports has a great influence on performance of the radio frequency system.

As can be seen, according to implementations of the present disclosure, the multiway switch provided is applicable to the electronic device 100 operable in the dual-frequency single-transmit mode. The electronic device 100 includes the antenna system 30, the radio frequency circuit 20, and the multiway switch 10. The antenna system 30 includes the four antennas. The multiway switch 10 includes the six T ports and the four P ports, and two of the six T ports are fully coupled with the four P ports. The multiway switch 10 is configured to be coupled with the radio frequency circuit 20 and the antenna system 30 to implement the preset function of transmitting an SRS through the four antennas corresponding to the four ports in turn of the electronic device 100.

In one possible implementation, in addition to the two first T ports, the six T ports further include four second T ports. Each of the four second T ports is coupled with one of the four P ports and among the four second T ports, any two second T ports at the same frequency band are coupled with different P ports. Each of the four P ports is configured to be coupled with a corresponding antenna of the four antennas, specifically, one P port is configured to be coupled with one antenna and any two P ports are configured to be coupled with different antennas. The two first T ports at least support a transmission function (that is, a signal transmission function), and the four second T ports support only a reception function (that is, a signal reception function).

In one implementation, the four second T ports are configured to receive signals at a first frequency band or configured to receive signals at a second frequency band, where the first frequency band is not overlapped with the second frequency band.

In one implementation, the expression of "among the four second T ports, any two second T ports at the same frequency band being coupled with different P ports" means that second T ports operable at the same frequency band in the four second T ports are coupled with different P ports. For example, if second T port 1 is operable at the first frequency band and second T port 2 is also operable at the first frequency band, second T port 1 may be coupled with P port 1, second T port 2 may be coupled with P port 2, and P port 1 is different from P port 2.

In one possible implementation, the multiway switch 10 includes forty-six field-effect transistors.

Figure 4A:
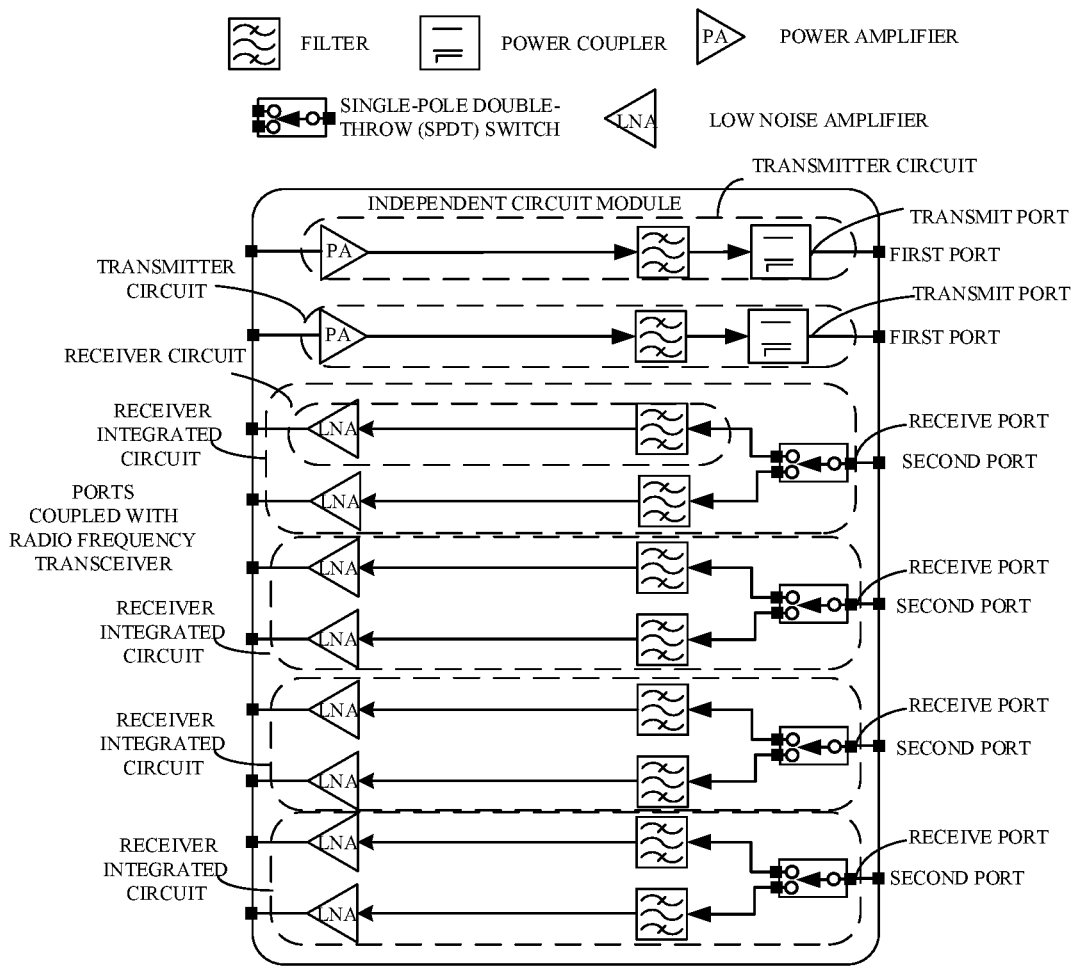
FIG. 4A is a schematic structural diagram illustrating a radio frequency circuit of an electronic device according to an implementation of the disclosure.
Figure 4B:
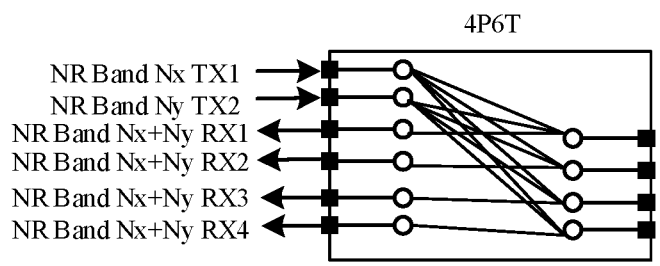
FIG. 4B is a schematic structural diagram illustrating a multiway switch of an electronic device according to an implementation of the disclosure.

In the case that the electronic device 100 is operable in the dual-frequency single-transmit mode, the electronic device 100 logically includes eight receiver circuits (can be comprehended as a circuit for receiving and/or processing signals) and two transmitter circuits (can be comprehended as a circuit for transmitting and/or processing signals). Since the multiway switch 10 includes the six T ports and the six T ports include the two first T ports, the number of field-effect transistors corresponding to the multiway switch 10 is 6+(2*4+(6−2)*1)*3+4=46. One of the two transmitter circuits can correspond to one first port (two first ports in total) that supports the transmission function and the first port is configured to be coupled with a corresponding first T port of the two first T ports of the multiway switch 10. In addition, two of the eight receiver circuits can correspond to one second port (four second ports in total) that supports only the reception function, where each second port is configured to be coupled with a corresponding second T port of the multiway switch 10. In this case, a schematic structure of a corresponding radio frequency circuit 20 is illustrated in FIG. 4A and a schematic structure of a corresponding multiway switch 10 is illustrated in FIG. 4B. The specific configuration of the transmitter circuit and the receiver circuit, and definitions related to the multiway switch 10 are similar to the foregoing implementations and will not be described herein again. In addition, it can be understood that, the exemplary matching manner of the radio frequency circuit 20 and the multiway switch 10 includes but is not limited to the structure of the drawings.

It can be seen that the multiway switch 10 of the implementation of the disclosure can enable the electronic device 100 to be operable in the dual-frequency single-transmit mode. It is beneficial to simplifying the radio frequency architecture of the terminal supporting four-port SRS switching in the 5G NR, reducing the number of switches in transmit paths and receive paths, and reducing path loss, thereby improving transmit power/sensitivity, data transmission rate in the 5G NR, and uplink and downlink coverage of the mobile phone, and reducing power consumption.

In one possible implementation, the radio frequency circuit 20 of the electronic device 100 physically includes at least one independent circuit module. The at least one independent circuit module includes first ports and second ports. The first ports include transmit ports, and the transmit ports are configured to be coupled with the two first T ports in one-to-one correspondence. Specifically, the at least one independent circuit module may have one or more transmit ports. The second ports include receive ports, and the receive ports are configured to be coupled with four second T ports in one-to-one correspondence. Specifically, the at least one independent circuit module may have one or more receive ports. The "transmit port" refers to a port (may be composed of one or more components) which implements a corresponding transmission function and is located on the path of one transmitter circuit. The "receive port" refers to a port (may be composed of one or more components) which implements a corresponding reception function and is located on the path after integration of receiver circuits. It should be noted that the ports such as transmit ports and receive ports illustrated in the figures are exemplary and do not intend to indicate an exact port position and impose any restrictions.

The radio frequency circuit 20 logically includes two transmitter circuits and eight receiver circuits.

Since low-noise amplifiers (LNA) in the eight receiver circuits can operate simultaneously, due to their low power and low power consumption, mutual influence can be avoided through design. Therefore, multiple LNAs in multiple receiver circuits at the same frequency band can be disposed in the same circuit module. However, two power amplifiers (PAs) at the same frequency band can work simultaneously (corresponding to UL MIMO mode), a transmit power will be high, and two signals will interfere with each other. In addition, the two PAs will affect heat dissipation efficiency when working at the same time. Two transmitter circuits at different frequency bands are provided in the implementations of the disclosure, and therefore it is necessary to provide one independent circuit module or more than one independent circuit modules.

Figure 5:
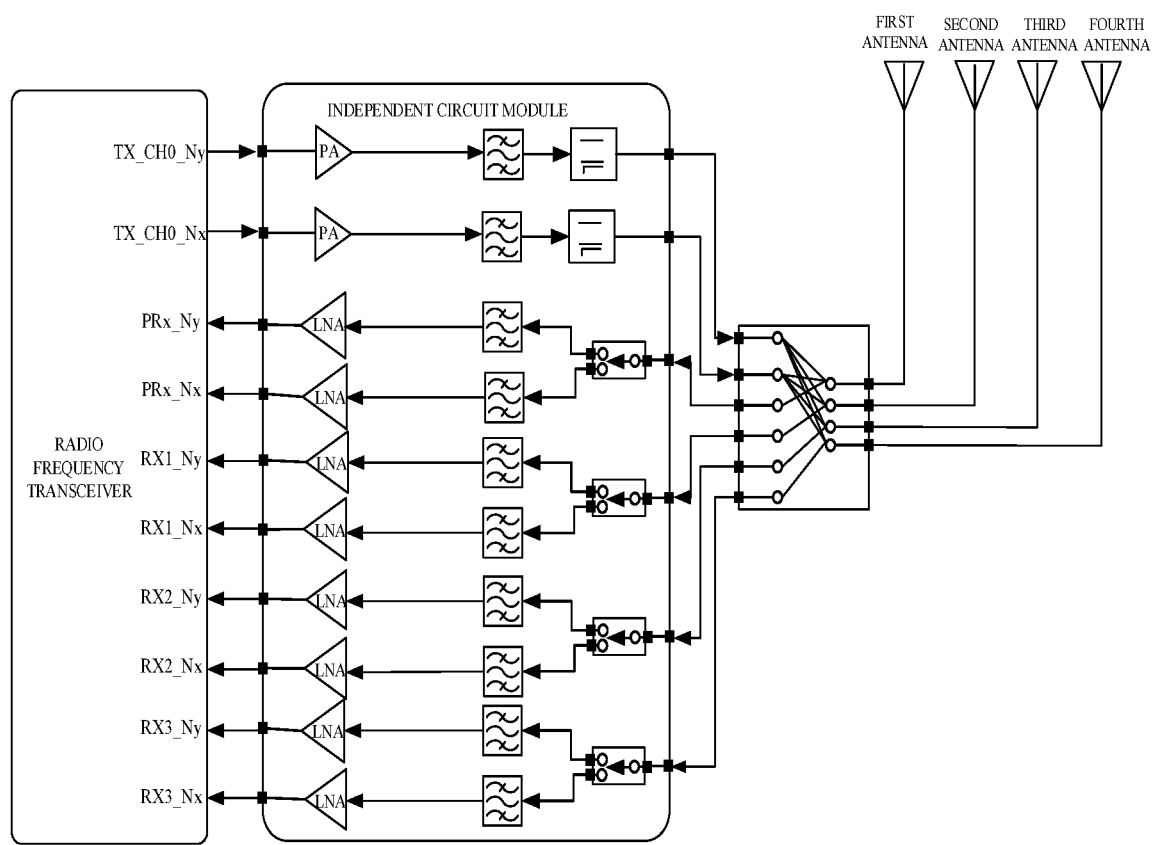
FIG. 5 is a schematic structural diagram illustrating an electronic device according to an implementation of the disclosure.

When the radio frequency circuit 20 physically includes one independent circuit module, a schematic structure of a corresponding electronic device 100 is illustrated in FIG. 5, and the independent circuit module includes two transmitter circuits and eight receiver circuits.

In one possible implementation, as illustrated in FIG. 5, the at least one independent circuit module is embodied as one independent circuit module. The independent circuit module includes two transmitter circuits, four receiver integrated circuits, two first ports, and four second ports. The first ports are configured to be coupled with the first T ports in one-to-one correspondence and the second ports are configured to be coupled with the second T ports in one-to-one correspondence. The two transmitter circuits are operable at different frequency bands and each transmitter circuit has a transmit port coupled with one of the two first ports of the independent circuit module. Each receiver integrated circuit includes two receiver circuits operable at different frequency bands and has a receive port coupled with one of the four second ports of the independent circuit module.

Figure 6A:
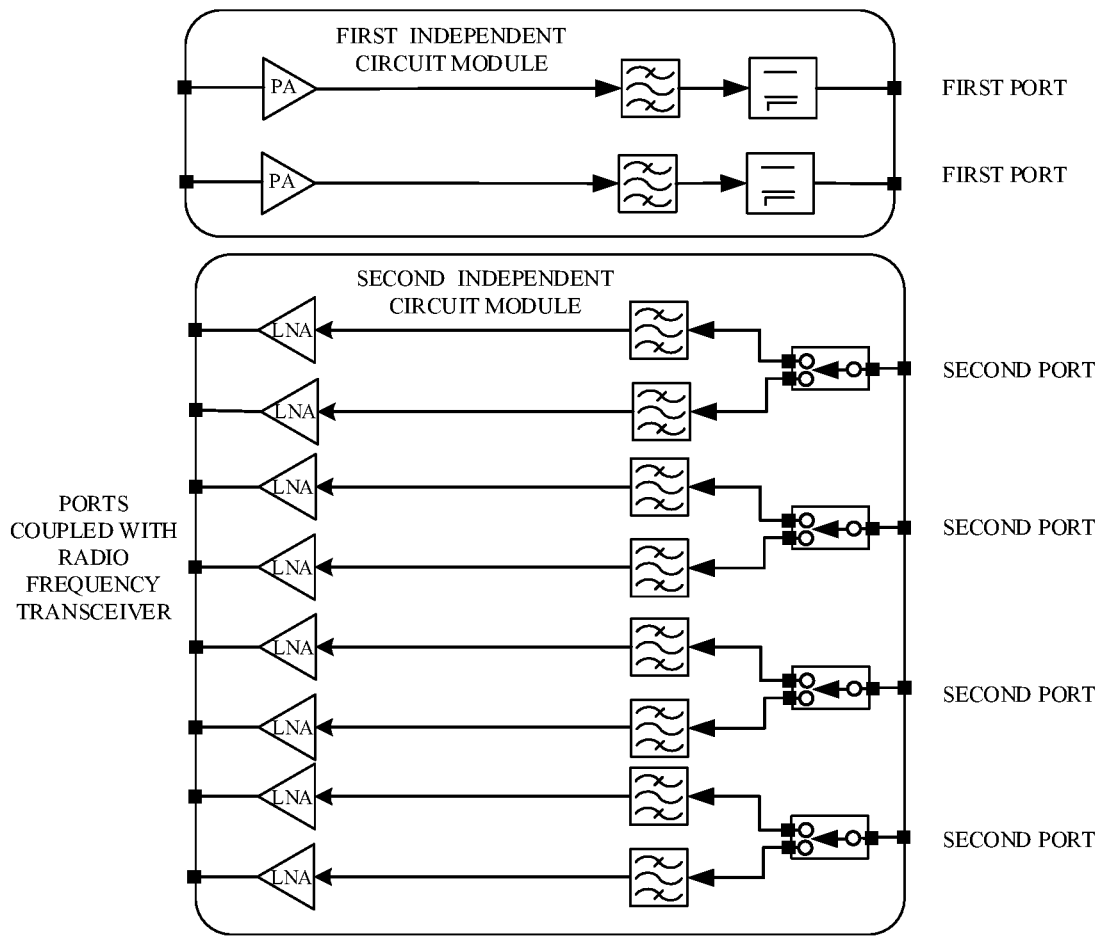
FIG. 6A is a schematic structural diagram illustrating a radio frequency circuit of an electronic device according to an implementation of the disclosure.
Figure 6B:
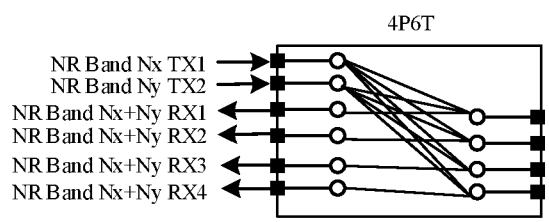
FIG. 6B is a schematic structural diagram illustrating a multiway switch of an electronic device according to an implementation of the disclosure.

In one possible implementation, as illustrated in FIG. 6A and FIG. 6B, the at least one independent circuit module is embodied as two independent circuit modules, that is, a first independent circuit module and a second independent circuit module.

The first independent circuit module includes two transmitter circuits and two first ports. The two transmitter circuits are operable at different frequency bands, and each transmitter circuit has a transmit port coupled with one of the two first ports of the first independent circuit module.

The second independent circuit module includes four receiver integrated circuits and four second ports. Each receiver integrated circuit includes two receiver circuits operable at different frequency bands and has a receive port coupled with one of the four second ports of the second independent circuit module.

The first ports are configured to be coupled with the two first T ports in one-to-one correspondence and the second ports are configured to be coupled with the four second T ports in one-to-one correspondence. In other words, each first port is configured to be coupled with one of the two first T ports and each second port is configured to be coupled with one of the four second T ports.

Figure 7A:
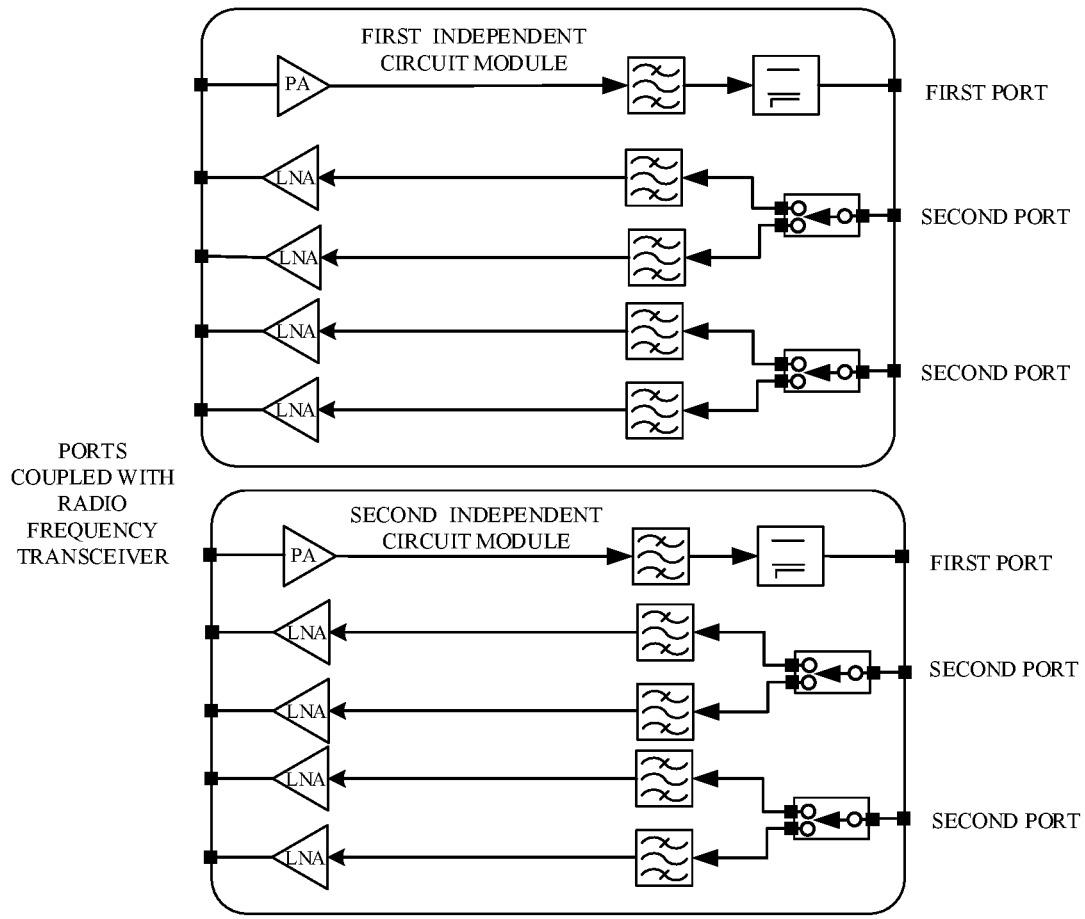
FIG. 7A is a schematic structural diagram illustrating another radio frequency circuit of an electronic device according to an implementation of the disclosure.
Figure 7B:
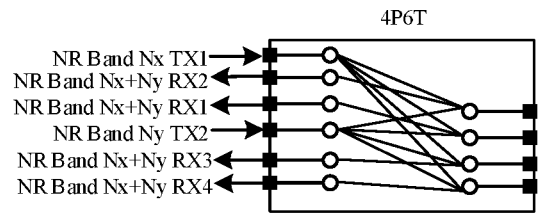
FIG. 7B is a schematic structural diagram illustrating another multiway switch of an electronic device according to an implementation of the disclosure.

In one possible implementation, as illustrated in FIG. 7A and FIG. 7B, the at least one independent circuit module is embodied as two independent circuit modules, that is, a first independent circuit module and a second independent circuit module.

The first independent circuit module and the second independent circuit module each include one transmitter circuit, two receiver integrated circuits, one first port, and two second ports. The transmitter circuit has a transmit port coupled with the first port of an independent circuit module to which the transmitter circuit belongs. Each receiver integrated circuit includes two receiver circuits operable at different frequency bands and has a receive port coupled with one of the two second ports of an independent circuit module to which the receiver integrated circuit belongs.

The first ports are configured to be coupled with the two first T ports in one-to-one correspondence and the second ports are configured to be coupled with the four second T ports in one-to-one correspondence.

Figure 8A:
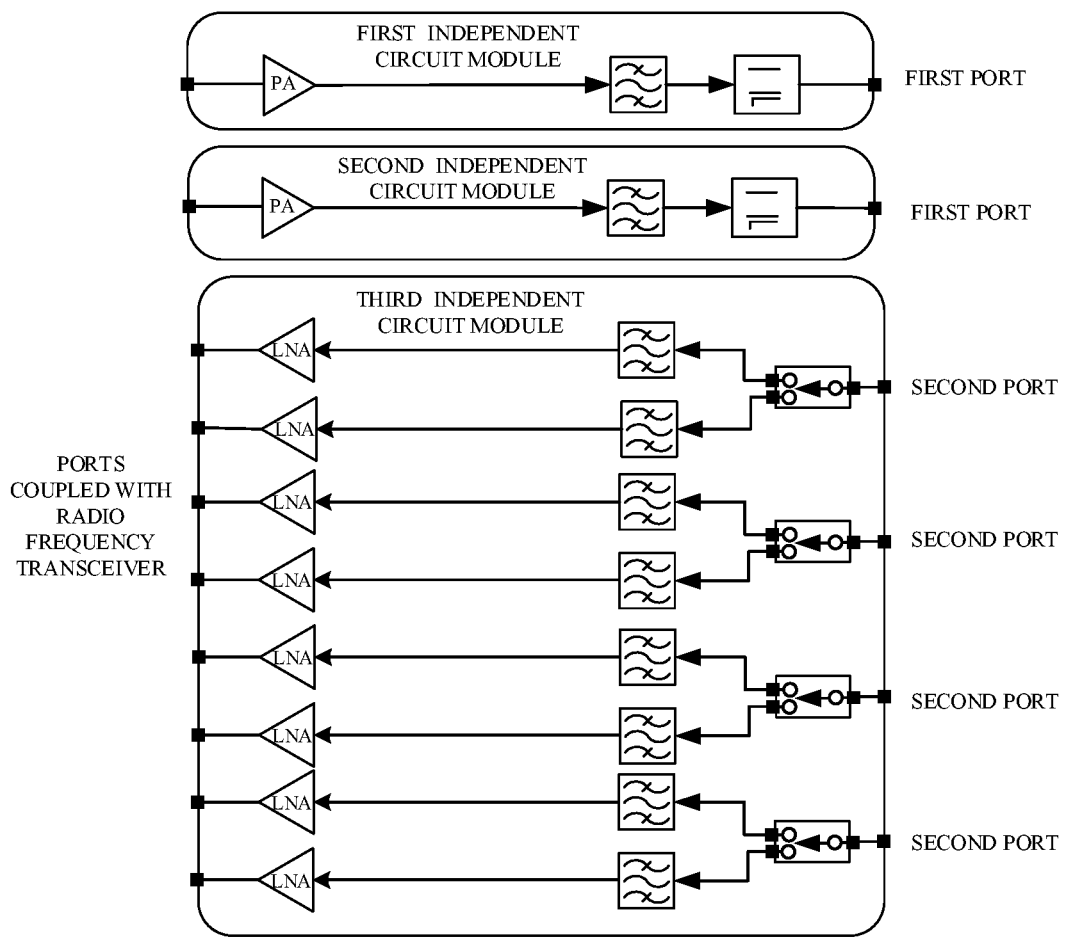
FIG. 8A is a schematic structural diagram illustrating yet another radio frequency circuit of an electronic device according to an implementation of the disclosure.
Figure 8B:
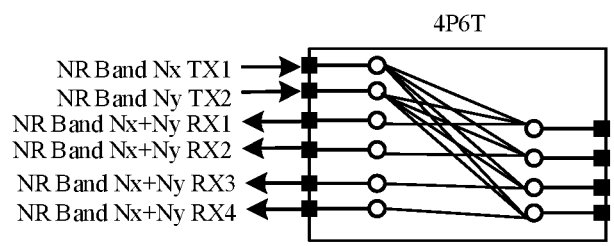
FIG. 8B is a schematic structural diagram illustrating yet another multiway switch of an electronic device according to an implementation of the disclosure.

In one possible implementation, as illustrated in FIG. 8A and FIG. 8B, the at least one independent circuit module is embodied as three independent circuit modules, that is, a first independent circuit module, a second independent circuit module, and a third independent circuit module.

The first independent circuit module and the second independent circuit module each include one transmitter circuit and one first port. The transmitter circuit has a transmit port coupled with the first port of an independent circuit module to which the transmitter circuit belongs.

The third independent circuit module includes four receiver integrated circuits and four second ports. Each receiver integrated circuit includes two receiver circuits operable at different frequency bands and has a receive port coupled with one of the four second ports of the third independent circuit.

The first ports are configured to be coupled with the two first T ports in one-to-one correspondence and the second ports are configured to be coupled with the four second T ports in one-to-one correspondence.

Figure 9A:
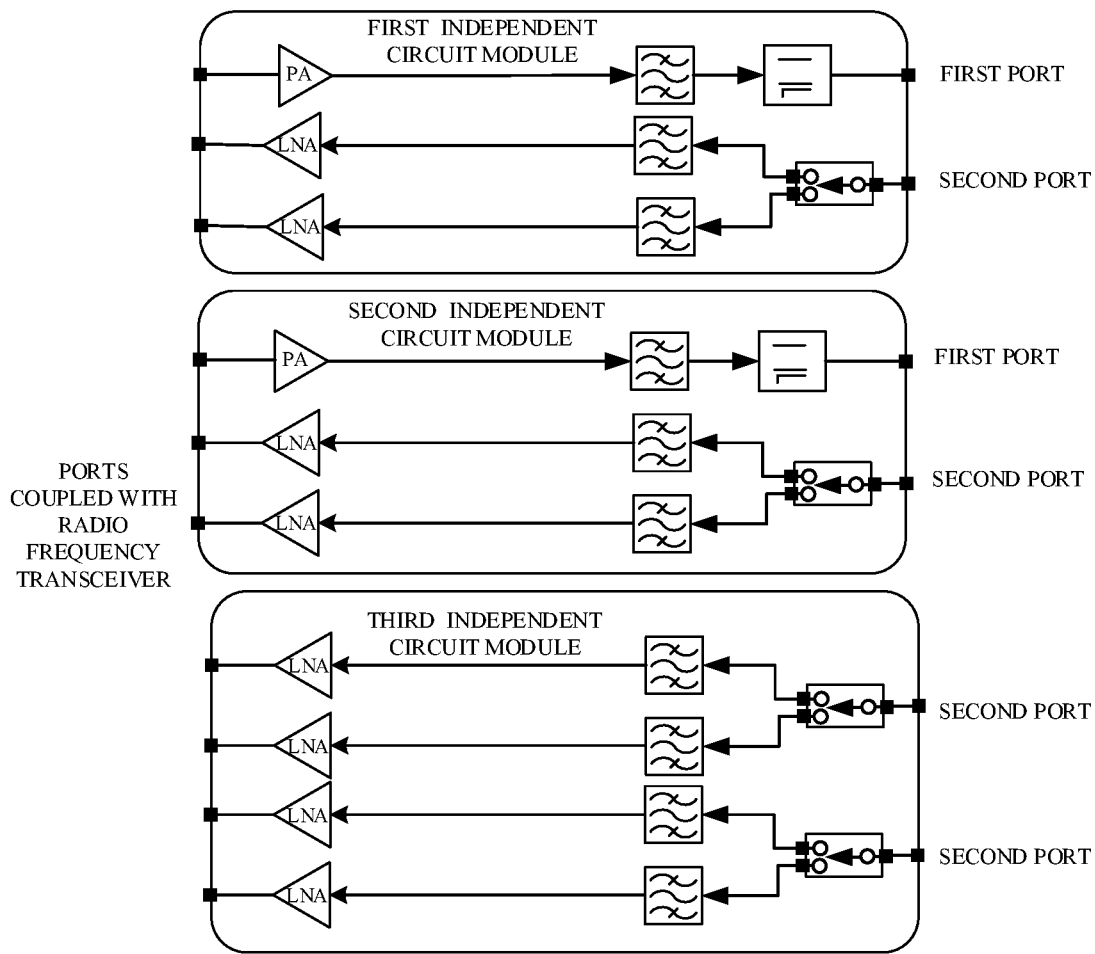
FIG. 9A is a schematic structural diagram illustrating still another radio frequency circuit of an electronic device according to an implementation of the disclosure.
Figure 9B:
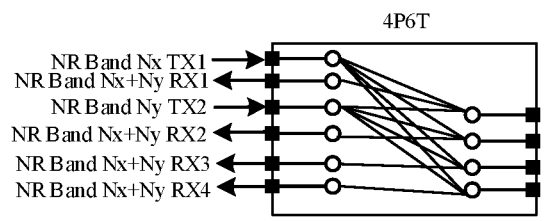
FIG. 9B is a schematic structural diagram illustrating still another multiway switch of an electronic device according to an implementation of the disclosure.

In one possible implementation, as illustrated in FIG. 9A and FIG. 9B, the at least one independent circuit module is embodied as three independent circuit modules, that is, a first independent circuit module, a second independent circuit module, and a third independent circuit module.

The first independent circuit module and the second independent circuit module each include one transmitter circuit, one receiver integrated circuit, one first port, and one second port. The receiver integrated circuit includes two receiver circuits operable at different frequency bands, and has a receive port coupled with the second port of an independent circuit module to which the receiver integrated circuit belongs. The transmitter circuit has a transmit port coupled with the first port of an independent circuit module to which the transmitter circuit belongs.

The third independent circuit module includes two receiver integrated circuits and two second ports, and each receiver integrated circuit includes two receiver circuits operable at different frequency bands and has a receive port coupled with one of the two second ports of the third independent circuit module.

The first ports are configured to be coupled with the two first T ports in one-to-one correspondence and the second ports are configured to be coupled with the four second T ports in one-to-one correspondence.

Figure 10A:
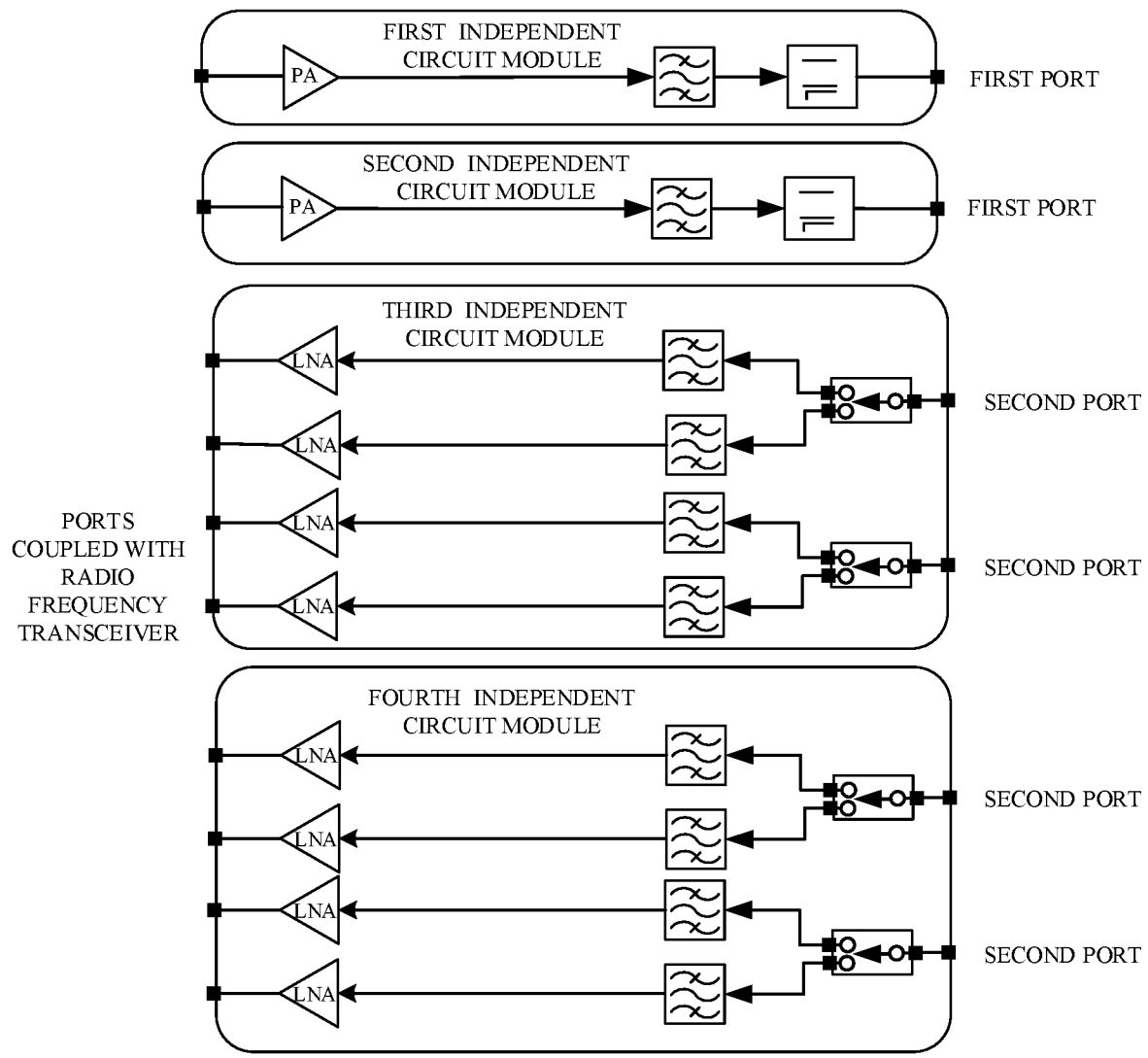
FIG. 10A is a schematic structural diagram illustrating still another radio frequency circuit of an electronic device according to an implementation of the disclosure.
Figure 10B:
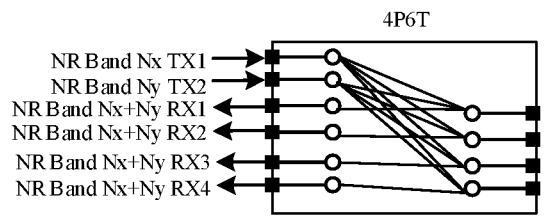
FIG. 10B is a schematic structural diagram illustrating still another multiway switch of an electronic device according to an implementation of the disclosure.

In one possible implementation, as illustrated in FIG. 10A and FIG. 10B, the at least one independent circuit module is embodied as four independent circuit modules, that is, a first independent circuit module, a second independent circuit module, a third independent circuit module, and a fourth independent circuit module.

The first independent circuit module and the second independent circuit module each include one transmitter circuit and one first port. The transmitter circuit has a transmit port coupled with the first port of an independent circuit module to which the transmitter circuit belongs.

The third independent circuit module and the fourth independent circuit module each include two receiver integrated circuits and two second ports. Each receiver integrated circuit includes two receiver circuits operable at different frequency bands and has a receive port coupled with one of the two second ports of an independent circuit module to which the receiver integrated circuit belongs.

The first ports are configured to be coupled with the two first T ports in one-to-one correspondence and the second ports are configured to be coupled with the four second T ports in one-to-one correspondence.

Figure 11A:
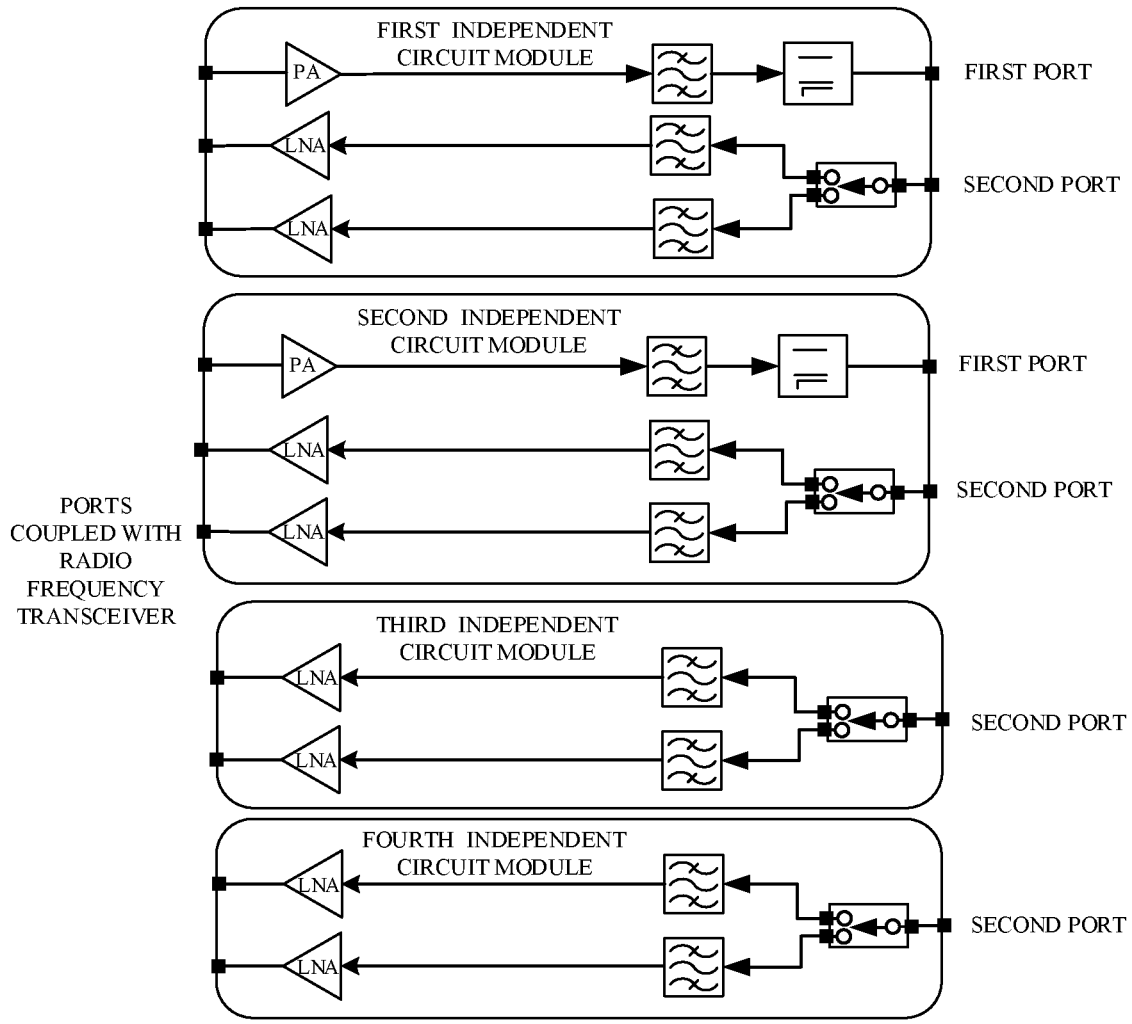
FIG. 11A is a schematic structural diagram illustrating still another radio frequency circuit of an electronic device according to an implementation of the disclosure.
Figure 11B:
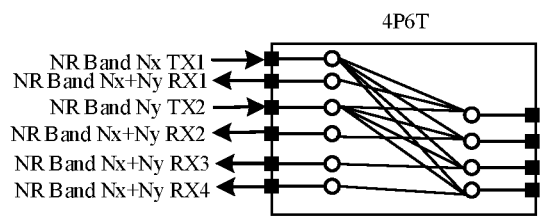
FIG. 11B is a schematic structural diagram illustrating still another multiway switch of an electronic device according to an implementation of the disclosure.

In one possible implementation, as illustrated in FIG. 11A and FIG. 11B, the at least one independent circuit module is embodied as four independent circuit modules, that is, a first independent circuit module, a second independent circuit module, a third independent circuit module, and a fourth independent circuit module.

The first independent circuit module and the second independent circuit module each include one transmitter circuit, one receiver integrated circuit, one first port, and one second port. The transmitter circuit has a transmit port coupled with the first port of an independent circuit module to which the transmitter circuit belongs. The receiver integrated circuit includes two receiver circuits operable at different frequency bands and has a receive port coupled with the second port of an independent circuit module to which the receiver integrated circuit belongs.

The third independent circuit module and the fourth independent circuit module each include one receiver integrated circuit and one second port. The receiver integrated circuit includes two receiver circuits operable at different frequency bands and has a receive port coupled with the second port of an independent circuit module to which the receiver integrated circuit belongs.

The first ports are configured to be coupled with the two first T ports in one-to-one correspondence and the second ports are configured to be coupled with the four second T ports in one-to-one correspondence.

Figure 12A:
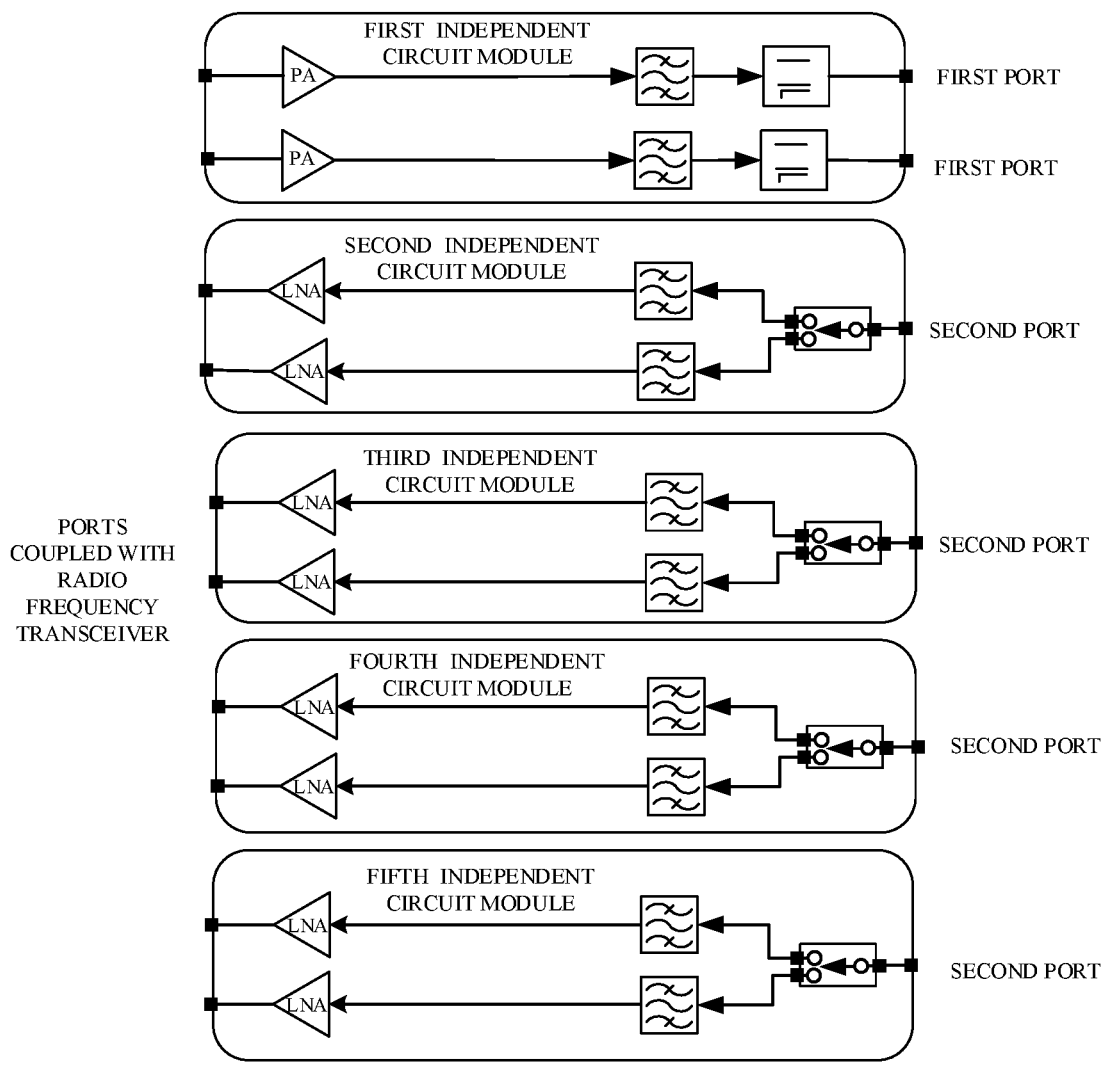
FIG. 12A is a schematic structural diagram illustrating still another radio frequency circuit of an electronic device according to an implementation of the disclosure.
Figure 12B:
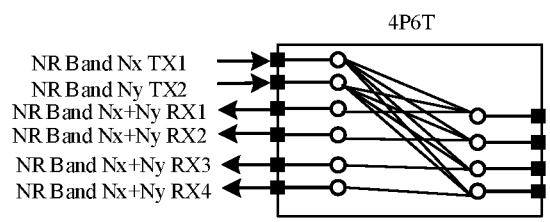
FIG. 12B is a schematic structural diagram illustrating still another multiway switch of an electronic device according to an implementation of the disclosure.

In one possible implementation, as illustrated in FIG. 12A and FIG. 12B, the at least one independent circuit module is embodied as five independent circuit modules, that is, a first independent circuit module, a second independent circuit module, a third independent circuit module, a fourth independent circuit module, and a fifth independent circuit module.

The first independent circuit module includes two transmitter circuits and two first ports. The two transmitter circuits are operable at different frequency bands and each transmitter circuit has a transmit port coupled with one of the two first ports of the first independent circuit module.

The second independent circuit module, the third independent circuit module, the fourth independent circuit module, and the fifth independent circuit module each include one receiver integrated circuit and one second port. The receiver integrated circuit includes two receiver circuits operable at different frequency bands and has a receive port coupled with the second port of an independent circuit module to which the receiver integrated circuit belongs.

The first ports are configured to be coupled with the two first T ports in one-to-one correspondence and the second ports are configured to be coupled with the four second T ports in one-to-one correspondence.

Figure 13A:
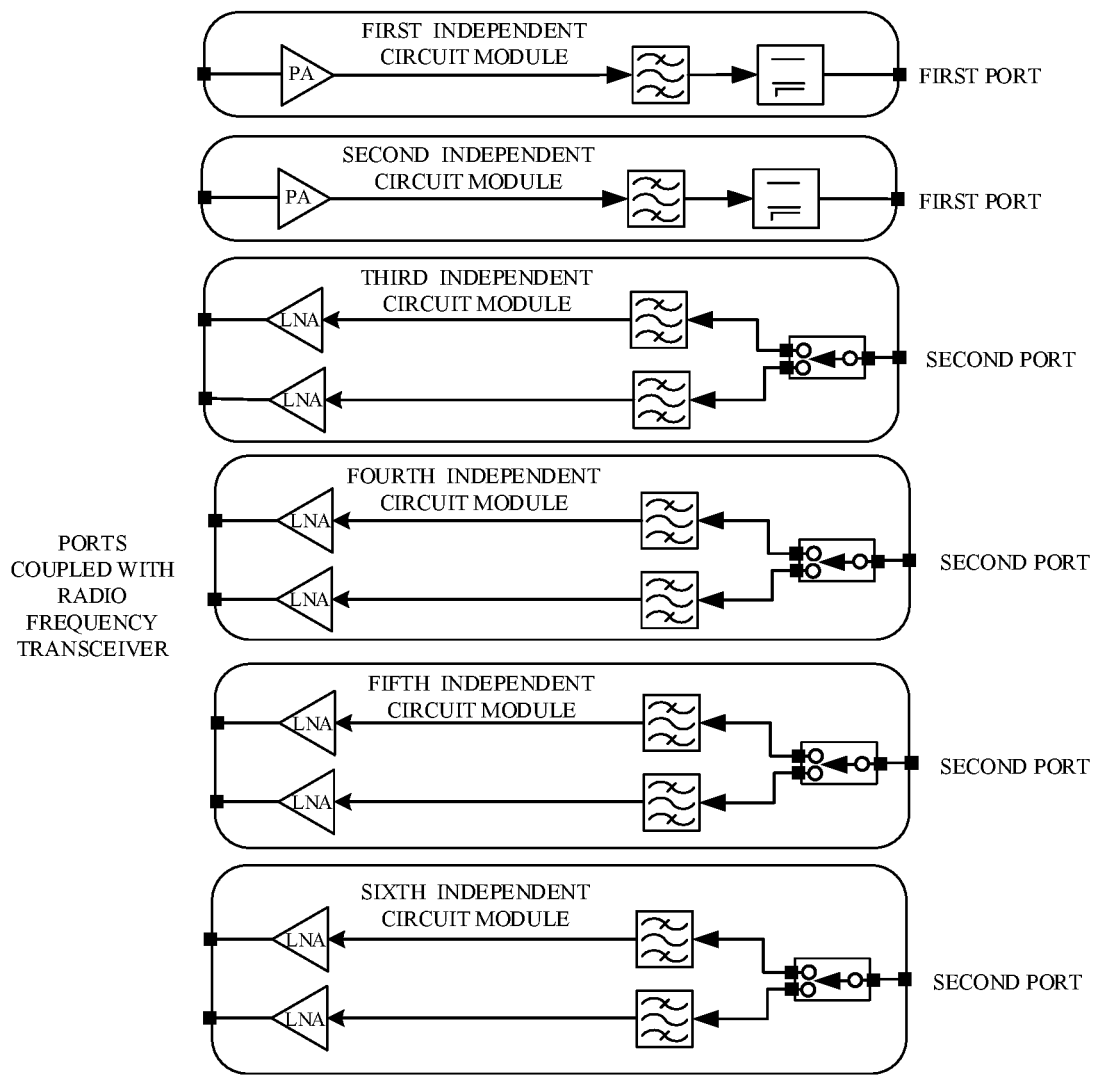
FIG. 13A is a schematic structural diagram illustrating still another radio frequency circuit of an electronic device according to an implementation of the disclosure.
Figure 13B:
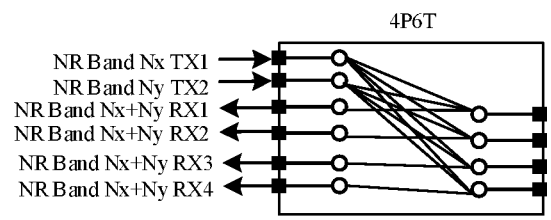
FIG. 13B is a schematic structural diagram illustrating still another multiway switch of an electronic device according to an implementation of the disclosure.

In one possible implementation, as illustrated in FIG. 13A and FIG. 13B, the at least one independent circuit module is embodied as six independent circuit modules, that is, a first independent circuit module, a second independent circuit module, a third independent circuit module, a fourth independent circuit module, a fifth independent circuit module, and a sixth independent circuit module.

The first independent circuit module and the second independent circuit module each include one transmitter circuit and one first port. The transmitter circuit has a transmit port coupled with the first port of an independent circuit module to which the transmitter circuit belongs.

The third independent circuit module, the fourth independent circuit module, the fifth independent circuit module, and the sixth independent circuit module each include one receiver integrated circuit and one second port. The receiver integrated circuit includes two receiver circuits operable at different frequency bands and has a receive port coupled with the second port of an independent circuit module to which the receiver integrated circuit belongs.

The first ports are configured to be coupled with the two first T ports in one-to-one correspondence and the second ports are configured to be coupled with the four second T ports in one-to-one correspondence.

It can be understood that, the above-mentioned receiver circuits and transmitter circuits can be implemented in various manners. The implementations of the disclosure are not particularly restricted.

Each transmitter circuit involved in the foregoing implementations of the disclosure includes a power amplifier (PA), a filter, and a power coupler. The PA is coupled with the filter, and the filter is coupled with the power coupler. The power coupler is configured to be coupled with one first T port of the multiway switch 10 and the PA is configured to be coupled with a radio frequency transceiver.

Each receiver circuit involved in the foregoing implementations of the disclosure includes an LNA and a filter. The LNA is coupled with the filter, the filter is configured to be coupled with one second T port of the multiway switch 10, and the LNA is configured to be coupled with the radio frequency transceiver.

The transmit port of one transmitter circuit corresponds to one transmit port of an independent circuit module, which is configured to be coupled with a corresponding first T port of the multiway switch 10. The receive port of one receiver integrated circuit corresponds to one receive port of an independent circuit module, which is configured to be coupled with a corresponding second T port of the multiway switch 10.

As illustrated in FIG. 5, the independent circuit module includes a first transmitter circuit, a second transmitter circuit, a first receiver integrated circuit, a second receiver integrated circuit, a third receiver integrated circuit, and a fourth receiver integrated circuit. The first transmitter circuit includes a PA, a filter, and a power coupler. The PA is coupled with the filter, and the filter is coupled with the power coupler. The power coupler is coupled with one first T port (the first of the two first T ports) of the multiway switch 10. The PA of the first transmitter circuit is coupled with a "TX-CH0-Ny" pin (a first transmit port at the Ny frequency band) of a radio frequency transceiver. The second transmitter circuit includes a PA and a power coupler coupled with the other first T port (the second of the two first T ports) of the multiway switch 10. The PA of the second transmitter circuit is coupled with a "TX-CH0-Nx" pin (a first transmit port at the Nx frequency band) of the radio frequency transceiver. The first receiver integrated circuit includes two filters, a first single-pole double-throw (SPDT) switch, and two low-noise amplifiers (LNAs). The two filters are coupled with the first SPDT switch, and the first SPDT switch is coupled with one second T port (the first of the four second T ports) of the multiway switch 10. The two LNAs of the first receiver integrated circuit are respectively coupled with a "PRx-Ny" pin (a first receive port at the Ny frequency band) and a "PRx-Nx" pin (a first receive port at the Nx frequency band) of the radio frequency transceiver. The second receiver integrated circuit includes two filters, a second SPDT switch, and two LNAs. The two filters are coupled with the second SPDT switch, and the second SPDT switch is coupled with another second T port (the second of the four second T ports) of the multiway switch 10. The two LNAs of the second receiver integrated circuit are respectively coupled with a "RX1-Ny" pin (a second receive port at the Ny frequency band) and a "RX1-Nx" pin (a second receive port at the Nx frequency band) of the radio frequency transceiver. The third receiver integrated circuit includes two filters, a third SPDT switch, and two LNAs. The two filters are coupled with the third SPDT switch, and the third SPDT switch is coupled with another second T port (the third of the four second T ports) of the multiway switch 10. The two LNAs of the third receiver integrated circuit are respectively coupled with a "RX2-Ny" pin (a third receive port at the Ny frequency band) and a "RX2-Nx" pin (a third receive port at the Nx frequency band) of the radio frequency transceiver. The fourth receiver integrated circuit includes two filters, a fourth SPDT switch, and two LNAs. The two filters are coupled with the fourth SPDT switch, and the fourth SPDT switch is coupled with the remaining one second T port (the fourth of the four second T ports) of the multiway switch 10. The two LNAs of the fourth receiver integrated circuit are respectively coupled with a "RX3-Ny" pin (a fourth receive port at the Ny frequency band) and a "RX3-Nx" pin (a fourth receive port at the Nx frequency band) of the radio frequency transceiver.

The coupling manners of the radio frequency transceiver, the radio frequency circuit 20, and the multiway switch 10 illustrated in FIGS. 6A, 7A, 8A, 9A, 10A, 11A, 12A, and 13A are similar as that of the radio frequency transceiver, the radio frequency circuit 20, and the multiway switch 10 illustrated in FIG. 5 and are not repeated herein.

Annotations of the multiway switch 10 illustrated in FIG. 4B are described in detail hereinafter. "NR Band Nx TX1" represents a pin corresponding to one transmitter circuit at the Nx frequency band. "NR Band Ny TX2" represents a pin corresponding to one transmitter circuit at the Ny frequency band. "NR Band Nx+Ny RX1" represents a pin corresponding to a first receiver integrated circuit at the Nx frequency band and the Ny frequency band. "NR Band Nx+Ny RX2" represents a pin corresponding to a second receiver integrated circuit at the Nx frequency band and the Ny frequency band. "NR Band Nx+Ny RX3" represents a pin corresponding to a third receiver integrated circuit at the Nx frequency band and the Ny frequency band. "NR Band Nx+Ny RX4" represents a pin corresponding to a fourth receiver integrated circuit at the Nx frequency band and the Ny frequency band.

Annotations of the multiway switch illustrated in FIGS. 6B, 7B, 8B, 9B, 10B, 11B, 12B, and 13B are similar as that of the multiway switch 10 illustrated in FIG. 4B, and are not repeated herein.

As can be seen, in the implementation of the disclosure, the electronic device 100 can achieve a function of transmitting an SRS through the four antennas corresponding to the four P ports in turn of the electronic device 100 by controlling a state in which the T ports of the multiway switch 10 are coupled with the P ports of the multiway switch 10 via the switch transistors.

In one possible implementation, the four antennas include a first antenna, a second antenna, a third antenna, and a fourth antenna. These four antennas are all operable at a 5G NR frequency band.

The 5G NR frequency band may include, for example, 3.3 GHz to 3.8 GHz and 4.4 GHz to 5 GHz.

In one possible implementation, the four antennas include a first antenna, a second antenna, a third antenna, and a fourth antenna. The first antenna and the fourth antenna are antennas operable at a long term evolution (LTE) frequency band and a 5G NR frequency band. The second antenna and the third antenna are antennas only operable at the 5G NR frequency band.

The first antenna and fourth antenna are intended to support DL 4×4 MIMO for some frequency bands in LTE on terminals. These two antennas are shared with the 5G NR (hereinafter, "shared antennas" for short). The LTE frequency band may include, for example, 1880 MHz to 1920 MHz and 2496 MHz to 2690 MHz.

Figure 14:
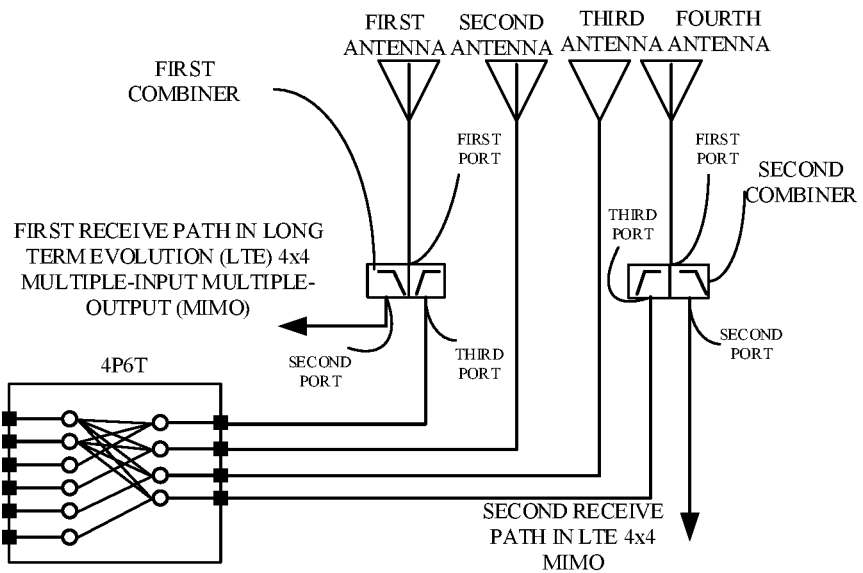
FIG. 14 is a schematic structural diagram illustrating an antenna system of an electronic device according to an implementation of the disclosure.

In one possible implementation, as illustrated in FIG. 14, the antenna system further includes a first combiner and a second combiner. The first combiner has a first port configured to be coupled with the first antenna, a second port configured to be coupled with a first receive path in LTE 4×4 MIMO) configuration of the electronic device, and a third port configured to be coupled with a corresponding P port of the multiway switch. The second combiner has a first port configured to be coupled with the fourth antenna, a second port configured to be coupled with a second receive path in the LTE 4×4 MIMO configuration of the electronic device, and a third port configured to be coupled with a corresponding P port of the multiway switch.

The LTE 4*4 MIMO is a downlink LTE receive circuit and can be defined as a third receive path. Since the LTE currently has two receive paths, in order to support LTE 4×4 MIMO, the third path and a fourth receive path are added.

According to performance of the four antennas, the electronic device will arrange one antenna with better performance for the circuit for PRX (primary receiver), and the antenna will be in a standby state. Moreover, first T ports of the switch having both the transmission function and the reception function can be configured for TX (transmit) and PRX purpose, and thus the antenna can be switched arbitrarily. In this way, there is no need to restrict the coupling between ports of shared antennas.

Figure 15:
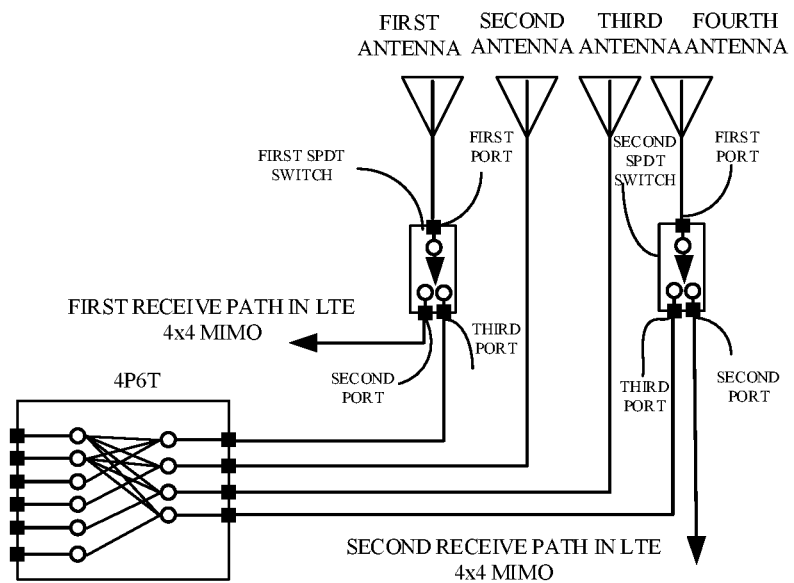
FIG. 15 is a schematic structural diagram illustrating another antenna system of an electronic device according to an implementation of the disclosure.

In one possible implementation, as illustrated in FIG. 15, the antenna system further includes a first single-pole double-throw (SPDT) switch and a second SPDT switch. The first SPDT switch has a first port configured to be coupled with the first antenna, a second port configured to be coupled with a first receive path in LTE 4×4 MIMO configuration of the electronic device, and a third port configured to be coupled with a corresponding P port of the multiway switch. The second SPDT switch has a first port configured to be coupled with the fourth antenna, a second port configured to be coupled with a second receive path in the LTE 4×4 MIMO configuration of the electronic device, and a third port configured to be coupled with a corresponding P port of the multiway switch.

The schemes of the disclosure can be combined or replaced with each other. For example, the antenna system and/or the multiway switch described above can be applied or combined into the radio frequency system and the wireless communication device below. It is to be noted that, "the antenna system and/or the multiway switch" of the disclosure means "the antenna system", "the multiway switch", or "the antenna system and the multiway switch".

Figure 16:
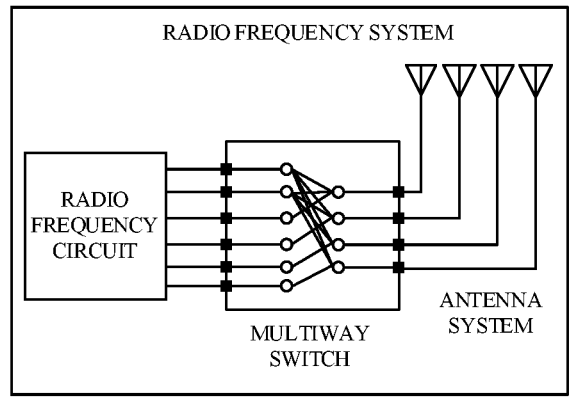
FIG. 16 is a schematic structural diagram illustrating a radio frequency system according to an implementation of the disclosure.

In one possible implementation, FIG. 16 is a schematic structural diagram illustrating a radio frequency system according to an implementation of the disclosure. The radio frequency system includes an antenna system, a radio frequency circuit, and a multiway switch coupled with the radio frequency circuit and the antenna system. The multiway switch has a structure as illustrated in any of the forgoing implementations and figures. In one implementation, the multiway switch includes six T ports and four P ports, the six T ports include two first T ports at least supporting a transmission function and four second T ports supporting only a reception function, and each of the two first T ports is coupled with all of the four P ports. The antenna system includes four antennas corresponding to the four P ports.

The multiway switch is configured to implement a preset function of transmitting an SRS through the four antennas in turn.

In one implementation, each of the four second T ports is coupled with one of the four P ports, and T ports at the same frequency band in the four second T ports are coupled with different P ports. Each of the four P ports is coupled with a corresponding antenna of the four antennas.

In one implementation, the four antennas includes a first antenna, a second antenna, a third antenna, and a fourth antenna. The first antenna, the second antenna, the third antenna, and the fourth antenna are antennas operable at a 5G NR frequency band.

In another implementation, the four antennas include a first antenna, a second antenna, a third antenna, and a fourth antenna. The first antenna and the fourth antenna are antennas operable at a long term evolution (LTE) frequency band and a 5G NR frequency band. The second antenna and the third antenna are antennas only operable at the 5G NR frequency band.

In one implementation, with the above structure regarding to the four antennas, the antenna system further includes a first combiner and a second combiner. The first combiner has a first port coupled with the first antenna, a second port coupled with a first receive path in LTE 4×4 MIMO configuration of the radio frequency system, and a third port coupled with a corresponding P port of the multiway switch. The second combiner has a first port coupled with the fourth antenna, a second port coupled with a second receive path in the LTE 4×4 MIMO configuration of the radio frequency system, and a third port coupled with a corresponding P port of the multiway switch.

In one implementation, with the above structure regarding to the four antennas, the antenna system 20 further includes a first single-pole double-throw (SPDT) switch and a second SPDT switch. The first SPDT switch has a first port coupled with the first antenna, a second port coupled with a first receive path in LTE 4×4 MIMO configuration of the radio frequency system, and a third port coupled with a corresponding P port of the multiway switch. The second SPDT switch has a first port coupled with the fourth antenna, a second port coupled with a second receive path in the LTE 4×4 MIMO configuration of the radio frequency system, and a third port coupled with a corresponding P port of the multiway switch.

As can be seen, for the transmit paths and the receive paths of the radio frequency system of the electronic device, the transmit paths can include one single independent switch (a 4P6T switch) or two independent switches (a SPDT switch and a 4P6T switch) and the receive paths can include one single independent switch (a 4P6T switch) or two independent switches (a SPDT switch and a 4P6T switch). That is to say, by integrating more switch functions of the transmit paths and the receive paths of the radio frequency system into the 4P6T switch, the number of independent switches of the transmit paths and the receive paths can be effectively reduced.

Figure 17:
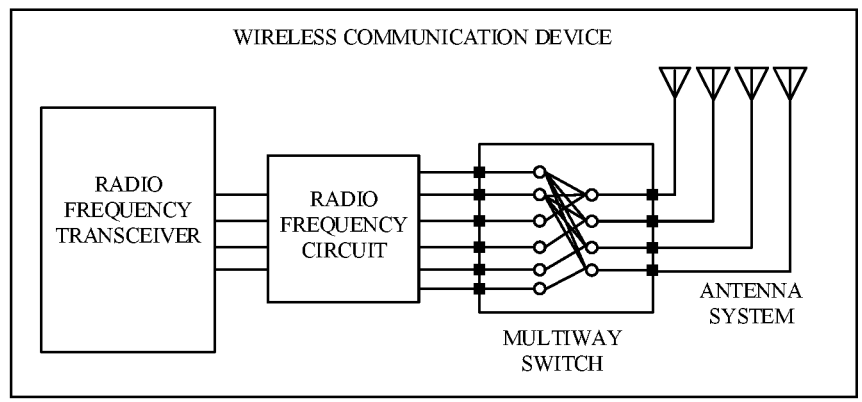
FIG. 17 is a schematic structural diagram illustrating a wireless communication device according to an implementation of the disclosure.

In one possible implementation, FIG. 17 is a schematic structural diagram illustrating a wireless communication device according to an implementation of the disclosure. The wireless communication device for example can be a wireless communication device, such as a mobile terminal, a base station, or the like, and includes an antenna system, a radio frequency transceiver, a radio frequency circuit coupled with the radio frequency transceiver, and a multiway switch coupled with the radio frequency circuit and the antenna system. The multiway switch can be the one described in any of the implementations above.

The multiway switch includes six T ports and four P ports. The six T ports include two first T ports, and each of the two first T ports is coupled with all of the four P ports. The antenna system include four antennas corresponding to the four P ports.

The multiway switch is configured to implement a preset function of transmitting an SRS through the four antennas in turn.

In one implementation, the six T ports further comprise four second T ports. Each of the four second T ports is coupled with one of the four P ports and T ports at the same frequency band in the four second T ports are coupled with different P ports. Each of the four P ports is coupled with a corresponding antenna of the four antennas, the two first T ports at least support a transmission function, and the four second T ports support only a reception function.

Figure 18:
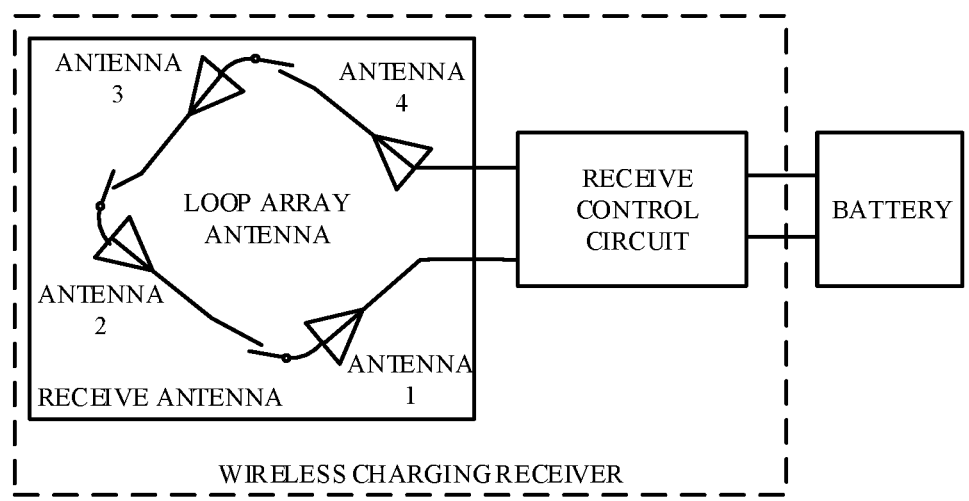
FIG. 18 is a schematic diagram illustrating a wireless charging receiver for multiplexing an antenna of a wireless communication device according to an implementation of the disclosure.

In addition, as illustrated in FIG. 18, the four antennas in the antenna system described in the implementations of the disclosure can also be multiplexed by a wireless charging receiver of the electronic device. The wireless charging receiver includes a receive antenna and a receive control circuit. The receive antenna matches transmit antennas of a wireless charging transmitter (resonates at the same or similar frequency and transfers energy in a wireless manner in the way of radiative resonant magnetic coupling). The receive control circuit converts, through a loop array antenna, the energy into a direct current (DC) to output to charge a battery. The receive control circuit can dynamically adjust a frequency of the loop array antenna and match the frequency of the loop array antenna with frequencies of the transmit antennas of the wireless charging transmitter to achieve paired charging. Alternatively, the receive control circuit interacts with the wireless charging transmitter in real time on a frequency change range to implement an "exclusive encryption" wireless charging mode.

The receive antenna may be an antenna including at least one of the four antennas (in the case of multiple antennas, the multiple antennas are strobed via switches).

Figure 19:
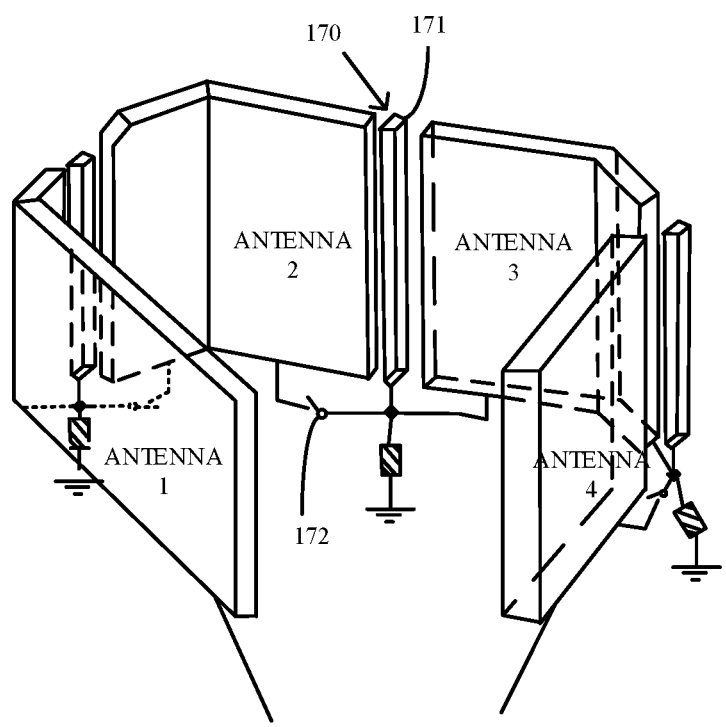
FIG. 19 is a schematic structural diagram illustrating a loop array antenna including four antennas according to an implementation of the disclosure.

For example, as illustrated in FIG. 19, the receive antenna is a loop array antenna including the four antennas described above. The four antennas include antenna 1, antenna 2, antenna 3, and antenna 4. Antenna 1 and antenna 4 are operable at both an LTE frequency band and a 5G NR frequency band, while antenna 2 and antenna 3 are only operable at the 5G NR frequency band. A port of antenna 1 and a port of antenna 4 are used as ports of the loop array antenna. Adjacent antennas are coupled via a gate circuit 170 with an isolation function. The gate circuit 170 includes a spacer 171 and a switch 172, where the spacer 171 is a conductor and the switch 172 is further coupled with a controller. The electronic device can conduct the switch 172 of each gate circuit 170 in a wireless charging mode to form a loop array antenna to receive energy. By adding the spacers 171 among the antennas, the gate circuit 170 can reduce mutual coupling among the multiple antennas of the electronic device in a normal communication mode, improve isolation among the multiple antennas, and optimize performance of the antennas. On the other hand, the multiple antennas can be coupled in series to form the loop array antenna through the switches 172, so as to better match the transmit antennas to transfer energy. Furthermore, since the capabilities of antenna 1 and antenna 4 are stronger than those of antenna 2 and antenna 3, the loop array antenna thus arranged can reduce energy loss in transmission as much as possible.

While the disclosure has been described in connection with certain implementations, it is to be pointed out that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A multiway switch, comprising:
    six throw (T) ports and $2^n$ pole (P) ports, the six T ports comprising two first T ports, and each of the two first T ports being coupled with all the $2^n$ P ports; n being an integer and $n \geq 2$;
    the multiway switch being configured to be coupled with a radio frequency circuit and an antenna system of a wireless communication device operable in a dual-frequency single-transmit mode, to implement a preset function of the wireless communication device, the antenna system comprising $2^n$ antennas corresponding to the $2^n$ P ports, and the preset function being a function of transmitting a sounding reference signal (SRS) through the $2^n$ antennas in turn;
    wherein
    the six T ports further comprise four second T ports;
    each of the four second T ports is coupled with one of the $2^n$ P ports, and T ports at the same frequency band in the four second T ports are coupled with different P ports;
    each of the $2^n$ P ports is configured to be coupled with a corresponding antenna of the $2^n$ antennas;
    the two first T ports at least support a transmission function; and
    the four second T ports support only a reception function.

2. The multiway switch of claim 1, wherein
    the radio frequency circuit logically comprises two transceiver circuits and $2^{n+1}$ receiver circuits;
    the radio frequency circuit physically comprises at least one independent circuit module;
    the at least one independent circuit module comprises first ports and second ports; and
    the first ports are configured to be coupled with the two first T ports in one-to-one correspondence and the second ports are configured to be coupled with four second T ports in one-to-one correspondence.

3. The multiway switch of claim 2, wherein n=2, and the at least one independent circuit module is embodied as one independent circuit module, and the independent circuit module comprises two transmitter circuits, four receiver integrated circuits, two first ports, and four second ports, wherein
    the two transmitter circuits are operable at different frequency bands and each transmitter circuit has a transmit port coupled with one of the two first ports of the independent circuit module; and
    each receiver integrated circuit comprises two receiver circuits operable at different frequency bands and has a receive port coupled with one of the four second ports of the independent circuit module.

4. The multiway switch of claim 3, wherein
    each transmitter circuit comprises a power amplifier (PA), a filter, and a power coupler, the PA is coupled with the filter, and the filter is coupled with the power coupler;

the power coupler is configured to be coupled with one first T port of the multiway switch and the PA is configured to be coupled with a radio frequency transceiver; and each receiver circuit comprises a low noise amplifier (LNA) and a filter, the LNA is coupled with the filter, the filter is configured to be coupled with one second T port of the multiway switch, and the LNA is configured to be coupled with the radio frequency transceiver.

5. The multiway switch of claim 2, wherein n=2, and the at least one independent circuit module is embodied as two independent circuit modules comprising a first independent circuit module and a second independent circuit module, wherein the first independent circuit module comprises two transmitter circuits and two first ports, the two transmitter circuits are operable at different frequency bands, and each transmitter circuit has a transmit port coupled with one of the two first ports of the first independent circuit module; and the second independent circuit module comprises four receiver integrated circuits and four second ports, and each receiver integrated circuit comprises two receiver circuits operable at different frequency bands and has a receive port coupled with one of the four second ports of the second independent circuit module.

6. The multiway switch of claim 2, wherein n=2, and the at least one independent circuit module is embodied as two independent circuit modules comprising a first independent circuit module and a second independent circuit module, wherein the first independent circuit module and the second independent circuit module each comprise one transmitter circuit, two receiver integrated circuits, one first port, and two second ports;

the transmitter circuit has a transmit port coupled with the first port of an independent circuit module to which the transmitter circuit belongs; and each receiver integrated circuit comprises two receiver circuits operable at different frequency bands and has a receive port coupled with one of the two second ports of an independent circuit module to which the receiver integrated circuit belongs.

7. The multiway switch of claim 2, wherein n=2, and the at least one independent circuit module is embodied as three independent circuit modules comprising a first independent circuit module, a second independent circuit module, and a third independent circuit module, wherein the first independent circuit module and the second independent circuit module each comprise one transmitter circuit and one first port, and the transmitter circuit has a transmit port coupled with the first port of an independent circuit module to which the transmitter circuit belongs; and the third independent circuit module comprises four receiver integrated circuits and four second ports, and each receiver integrated circuit comprises two receiver circuits operable at different frequency bands and has a receive port coupled with one of the four second ports of the third independent circuit.

8. The multiway switch of claim 2, wherein n=2, and the at least one independent circuit module is embodied as three independent circuit modules comprising a first independent circuit module, a second independent circuit module, and a third independent circuit module, wherein the first independent circuit module and the second independent circuit module each comprise one transmitter circuit, one receiver integrated circuit, one first port, and one second port; the receiver integrated circuit comprises two receiver circuits operable at different frequency bands, and has a receive port coupled with the second port of an independent circuit module to which the receiver integrated circuit belongs; the transmitter circuit has a transmit port coupled with the first port of an independent circuit module to which the transmitter circuit belongs; and the third independent circuit module comprises two receiver integrated circuits and two second ports, and each receiver integrated circuit comprises two receiver circuits operable at different frequency bands and has a receive port coupled with one of the two second ports of the third independent circuit module.

9. The multiway switch of claim 2, wherein n=2, and the at least one independent circuit module is embodied as four independent circuit modules comprising a first independent circuit module, a second independent circuit module, a third independent circuit module, and a fourth independent circuit module, wherein the first independent circuit module and the second independent circuit module each comprise one transmitter circuit and one first port; the transmitter circuit has a transmit port coupled with the first port of an independent circuit module to which the transmitter circuit belongs; and the third independent circuit module and the fourth independent circuit module each comprise two receiver integrated circuits and two second ports, and each receiver integrated circuit comprises two receiver circuits operable at different frequency bands and has a receive port coupled with one of the two second ports of an independent circuit module to which the receiver integrated circuit belongs.

10. The multiway switch of claim 2, wherein n=2, and the at least one independent circuit module is embodied as five independent circuit modules comprising a first independent circuit module, a second independent circuit module, a third independent circuit module, a fourth independent circuit module, and a fifth independent circuit module, wherein the first independent circuit module comprises two transmitter circuits and two first ports; the two transmitter circuits are operable at different frequency bands and each transmitter circuit has a transmit port coupled with one of the two first ports of the first independent circuit module; and the second independent circuit module, the third independent circuit module, the fourth independent circuit module, and the fifth independent circuit module each comprise one receiver integrated circuit and one second port, wherein the receiver integrated circuit comprises two receiver circuits operable at different frequency bands and has a receive port coupled with the second port of an independent circuit module to which the receiver integrated circuit belongs.

11. The multiway switch of claim 2, wherein n=2, and the at least one independent circuit module is embodied as six independent circuit modules comprising a first independent circuit module, a second independent circuit module, a third independent circuit module, a fourth independent circuit module, a fifth independent circuit module, and a sixth independent circuit module, wherein the first independent circuit module and the second independent circuit module each comprise one transmitter circuit and one first port; the transmitter circuit has a transmit port coupled with the first port of an independent circuit module to which the transmitter circuit belongs; and the third independent circuit module, the fourth independent circuit module, the fifth independent circuit module, and the sixth independent circuit module each comprise one receiver integrated circuit and one second port, wherein the receiver integrated circuit comprises two receiver circuits operable at different frequency bands and has a receive port coupled with the second port of an independent circuit module to which the receiver integrated circuit belongs.

12. The multiway switch of claim 1, wherein n=2 and the multiway switch comprises forty-six field-effect transistors.

13. A radio frequency system, comprising an antenna system, a radio frequency circuit, and a multiway switch coupled with the radio frequency circuit and the antenna system;

the multiway switch comprising six throw (T) ports and $2^n$ pole (P) ports, the six T ports comprising two first T ports at least supporting a transmission function and four second T ports supporting only a reception function, and each of the two first T ports being coupled with all of the $2^n$ P ports; n being an integer and n≥2;

the antenna system comprising $2^n$ antennas corresponding to the $2^n$ P ports; and the multiway switch being configured to implement a preset function of transmitting a sounding reference signal (SRS) through the $2^n$ antennas in turn.

14. The radio frequency system of claim 13, wherein each of the four second T ports is coupled with one of the 2n P ports, and T ports at the same frequency band in the four second T ports are coupled with different P ports; and each of the $2^n$ P ports is coupled with a corresponding antenna of the $2^n$ antennas.

15. The radio frequency system of claim 13, wherein n=2, and the $2^n$ antennas comprise a first antenna, a second antenna, a third antenna, and a fourth antenna; and the first antenna, the second antenna, the third antenna, and the fourth antenna are antennas operable at a fifth generation new radio (5G NR) frequency band.

16. The radio frequency system of claim 13, wherein n=2, and the $2^n$ antennas comprise a first antenna, a second antenna, a third antenna, and a fourth antenna, wherein the first antenna and the fourth antenna are antennas operable at a long term evolution (LTE) frequency band and a 5G NR frequency band; and the second antenna and the third antenna are antennas only operable at the 5G NR frequency band; and the antenna system further comprises a first combiner and a second combiner, wherein the first combiner has a first port coupled with the first antenna, a second port coupled with a first receive path in LTE 4×4 multiple-input multiple-output (MIMO) configuration of the radio frequency system, and a third port coupled with a corresponding P port of the multiway switch; and the second combiner has a first port coupled with the fourth antenna, a second port coupled with a second receive path in the LTE 4×4 MIMO configuration of the radio frequency system, and a third port coupled with a corresponding P port of the multiway switch.

17. The radio frequency system of claim 13, wherein n=2, and the $2^n$ antennas comprise a first antenna, a second antenna, a third antenna, and a fourth antenna, wherein the first antenna and the fourth antenna are antennas operable at a long term evolution (LTE) frequency band and a 5G NR frequency band; and the second antenna and the third antenna are antennas only operable at the 5G NR frequency band; and the antenna system further comprises a first single-pole double-throw (SPDT) switch and a second SPDT switch, wherein the first SPDT switch has a first port coupled with the first antenna, a second port coupled with a first receive path in LTE 4×4 MIMO configuration of the radio frequency system, and a third port coupled with a corresponding P port of the multiway switch; and the second SPDT switch has a first port coupled with the fourth antenna, a second port coupled with a second receive path in the LTE 4×4 MIMO configuration of the radio frequency system, and a third port coupled with a corresponding P port of the multiway switch.

18. A wireless communication device, comprising an antenna system, a radio frequency transceiver, a radio frequency circuit coupled with the radio frequency transceiver, and a multiway switch coupled with the radio frequency circuit and the antenna system;

the multiway switch comprising six throw (T) ports and $2^n$ pole (P) ports; the six T ports comprising two first T ports, and each of the two first T ports being coupled with all the $2^n$ P ports; n being an integer and n≥2;

the antenna system comprising $2^n$ antennas corresponding to the $2^n$ P ports;

the multiway switch being configured to implement a preset function of transmitting a sounding reference signal (SRS) through the $2^n$ antennas in turn;

wherein the six T ports further comprise four second T ports;

each of the four second T ports is coupled with one of the $2^n$ P ports, and T ports at the same frequency band in the four second T ports are coupled with different P ports;

each of the $2^n$ P ports is coupled with a corresponding antenna of the $2^n$ antennas;

the two first T ports at least support a transmission function; and the four second T ports support only a reception function.

* * * * *